United States Patent
Kar et al.

(10) Patent No.: US 10,319,352 B2
(45) Date of Patent: Jun. 11, 2019

(54) NOTATION FOR GESTURE-BASED COMPOSITION

(71) Applicant: Intel Corporation, Santa Clara, CA (US)

(72) Inventors: Swarnendu Kar, Hillsboro, OR (US);
Dipika Jain, Hillsboro, OR (US);
Yingxi A Lin, Hillsboro, OR (US);
Saurin Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/582,120

(22) Filed: Apr. 28, 2017

(65) Prior Publication Data

US 2018/0315406 A1 Nov. 1, 2018

(51) Int. Cl.
*G09B 15/02* (2006.01)
*G10H 1/00* (2006.01)
(Continued)

(52) U.S. Cl.
CPC .......... *G10H 1/0008* (2013.01); *G06F 3/011* (2013.01); *G06F 3/017* (2013.01); *G06F 3/167* (2013.01);
(Continued)

(58) Field of Classification Search
CPC ........ G10H 1/18; G10H 1/0008; G06F 3/011; G06F 3/017; G06F 3/167; G09B 15/02; G09B 15/023
(Continued)

(56) References Cited

U.S. PATENT DOCUMENTS 4,980,519 A * 12/1990 Mathews ............... G06F 3/044
178/19.01
5,355,762 A * 10/1994 Tabata ................. G10H 1/0008
84/609

(Continued)

FOREIGN PATENT DOCUMENTS

WO WO 0108133 A1 * 2/2001 ............... G10G 1/00

OTHER PUBLICATIONS

"Air Guitar Anywhere!", Yanko Design, [Online]. Retrieved from the Internet: <URL: http://www.yankodesign.com/2013/06/12/air-guitar-anywhere/>, (accessed on Jul. 28, 2017), 7 pgs.
(Continued)

*Primary Examiner* — David S Warren
(74) *Attorney, Agent, or Firm* — Schwegman Lundberg & Woessner, P.A.

(57) ABSTRACT

Various systems and methods for air gesture-based composition and instruction systems are described herein. A composition system for composing gesture-based performances may receive an indication of an air gesture performed by a user; reference a mapping of air gestures to air gesture notations to identify an air gesture notation corresponding to the air gesture; and store an indication of the air gesture notation in a memory of the computerized composition system. Another system used for instruction may present a plurality of air gesture notations in a musical arrangement; receive an indication of an air gesture performed by a user; reference a mapping of air gestures to air gesture notations to identify an air gesture notation corresponding to the air gesture; and guide the user through the musical arrangement by sequentially highlighting the air gesture notations in the musical arrangement based on the mapping of air gestures to air gesture notations.

21 Claims, 9 Drawing Sheets

(51) Int. Cl.
  *G06F 3/01* (2006.01)
  *G10H 1/18* (2006.01)
  *G10G 1/00* (2006.01)
  *G06F 3/16* (2006.01)
  *G06K 9/00* (2006.01)

(52) U.S. Cl.
  CPC ............ *G06K 9/00355* (2013.01); *G10G 1/00* (2013.01); *G10H 1/18* (2013.01); *G06F 3/014* (2013.01); *G10H 2220/201* (2013.01); *G10H 2220/321* (2013.01); *G10H 2220/326* (2013.01); *G10H 2240/161* (2013.01)

(58) Field of Classification Search
  USPC .................. 84/615, 477 R, 483.1, 483.2
  See application file for complete search history.

(56) References Cited

U.S. PATENT DOCUMENTS

| | | | | |
|---|---|---|---|---|
| 5,541,358 A * | 7/1996 | Wheaton | G10H 1/00 | 84/645 |
| 5,585,584 A * | 12/1996 | Usa | G10H 1/00 | 84/600 |
| 5,627,335 A * | 5/1997 | Rigopulos | G10H 1/00 | 84/611 |
| 5,714,698 A * | 2/1998 | Tokioka | G06F 3/014 | 73/510 |
| 5,875,257 A * | 2/1999 | Marrin | G06F 3/011 | 382/107 |
| 6,150,600 A * | 11/2000 | Buchla | G10H 1/0555 | 84/688 |
| RE37,654 E * | 4/2002 | Longo | G10H 1/02 | 84/600 |
| 6,388,183 B1 * | 5/2002 | Leh | G10H 1/0008 | 84/645 |
| 6,794,568 B1 * | 9/2004 | Callaway | G10H 3/06 | 84/477 B |
| 6,897,779 B2 * | 5/2005 | Nishitani | G10H 1/0083 | 340/384.3 |
| 6,919,503 B2 * | 7/2005 | Nishitani | G10H 1/0058 | 84/633 |
| 7,704,135 B2 * | 4/2010 | Harrison, Jr. | A63F 9/24 | 463/14 |
| 7,781,666 B2 * | 8/2010 | Nishitani | G10H 1/00 | 84/600 |
| 8,198,526 B2 * | 6/2012 | Izen | G10H 3/146 | 84/743 |
| 8,362,350 B2 * | 1/2013 | Kockovic | G10H 1/34 | 84/743 |
| 8,445,769 B2 * | 5/2013 | Takahashi | G10H 1/0008 | 84/600 |
| 8,586,853 B2 * | 11/2013 | Sakazaki | G10H 1/053 | 84/725 |
| 8,664,506 B2 * | 3/2014 | Yamanouchi | G10H 1/42 | 84/422.4 |
| 8,664,508 B2 * | 3/2014 | Tabata | G10H 1/0008 | 84/723 |
| 8,710,345 B2 * | 4/2014 | Tabata | G10H 1/0008 | 84/615 |
| 8,710,347 B2 * | 4/2014 | Harada | G10H 1/14 | 84/600 |
| 8,860,547 B2 * | 10/2014 | Aichi | G08C 17/02 | 340/1.1 |
| 8,872,013 B2 | 10/2014 | Cooper et al. | | |
| 9,018,508 B2 * | 4/2015 | Sakurai | G10H 5/00 | 700/94 |
| 9,123,268 B2 * | 9/2015 | Uehara | G09F 13/34 | |
| 9,154,870 B2 * | 10/2015 | Watanabe | H04R 3/12 | |
| 9,418,645 B2 | 8/2016 | Little et al. | | |
| 9,737,797 B2 * | 8/2017 | Barney | A63F 13/235 | |
| 9,814,973 B2 * | 11/2017 | Barney | A63F 13/245 | |
| 9,847,079 B2 * | 12/2017 | Clement | G10H 3/00 | |
| 2001/0035087 A1 * | 11/2001 | Subotnick | G10H 1/0008 | 84/600 |
| 2003/0159567 A1 * | 8/2003 | Subotnick | G06F 3/017 | 84/626 |
| 2003/0188627 A1 * | 10/2003 | Longo | G10H 1/0066 | 84/627 |
| 2005/0076773 A1 * | 4/2005 | Yanagawa | G10F 1/00 | 84/615 |
| 2011/0252951 A1 * | 10/2011 | Leavitt | G10H 1/40 | 84/645 |
| 2012/0062718 A1 * | 3/2012 | David | G10H 1/40 | 348/77 |
| 2012/0144979 A1 * | 6/2012 | Tansley | G10H 1/0066 | 84/645 |
| 2016/0203805 A1 * | 7/2016 | Strachan | G10G 1/00 | 84/609 |
| 2017/0177091 A1 * | 6/2017 | Shah | G06F 3/017 | |

OTHER PUBLICATIONS

"Organically Creating Music with your Hands and Fingers", LEAP Motion, [Online]. Retrieved from the Internet: <URL: http://blog.leapmotion.com/organically-creating-music-with-your-hands-and-fingers/>, (accessed on Jul. 28, 2017), 8 pgs.

"Wearable Instrument for Creators", Remidi T8 Music Glove, [Online]. Retrieved from the Internet: <URL: https://www.remidi-pro.com/>, (accessed on Jul. 28, 2017), 2 pgs.

Rothman, Philip, "Touch Notation by Kawai: A promising music handwriting app for iOS", Touch Notation by Kawai: A promising music handwriting app for iOS—Scoring Notes, [Online]. Retrieved from the Internet: <URL: http://www.scoringnotes.com/news/touch-notation-by-kawai/>, (Apr. 23, 2015), 12 pgs.

* cited by examiner

NOTATION FOR GESTURE-BASED COMPOSITION

TECHNICAL FIELD

Embodiments described herein generally relate to gesture capture and translation and in particular, to notation for gesture-based composition.

BACKGROUND

Self-powered wearable electronic devices (wearable devices) have been adapted to a variety of form factors and are becoming increasingly popular with consumer users. A wearable device may include a variety of specialized circuitry and sensors to detect activity such as motion and acceleration, which result in gestures. Gestures include hand and arm movements in three-dimensional (3D) space. Some modern applications of gestures include the use of gestures to play virtual instruments and create music.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
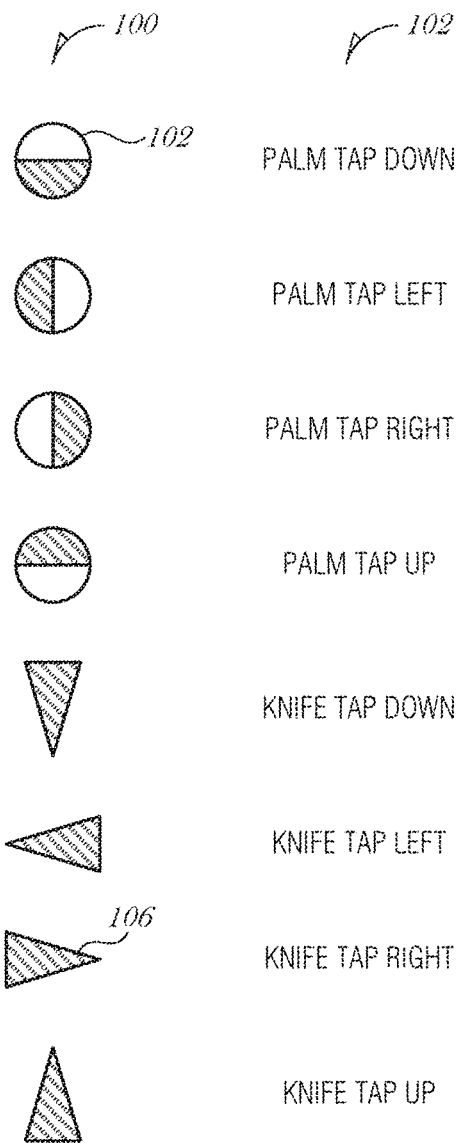
FIG. 1 illustrates musical notation for gesture-based composition, according to an embodiment.

In the following description, for purposes of explanation, numerous specific details are set forth in order to provide a thorough understanding of some example embodiments. It will be evident, however, to one skilled in the art that the present disclosure may be practiced without these specific details.

In the broadest sense, a gesture is any non-verbal communication that is intended to convey a specific message. A gesture may be performed by a person with their hands, arms, head, eyes, feet, legs, or the like. Gestures may be detected using cameras, with hand-held devices, or with on-body devices. For example, one or more cameras may be used to construct a depth image and determine the motion and orientation of a person's hand or arm. Using these motions, the system may determine a gesture performed by the person. Other mechanisms, such as a hand-held device or a glove, may rely on accelerometers, gyrometers, or other sensors on the device to determine motion, rotation, orientation, and the like.

Gesture detection and recognition may be performed using a variety of techniques. In a camera-based gesture recognition technique, the images of a person's gesture may be analyzed using 3D model-based techniques, skeletal-based techniques, or appearance-based modeling. For 3D modeling, the person's hand, for example, may be detected and extracted from an image to create a volumetric representation. In some implementations, machine learning techniques are employed to recognize and classify gestures.

Non-camera-based gesture recognition techniques may be implemented with a glove, a wristband, a shoe, an anklet, a hand-held device, or other types of devices that are capable of registering the orientation, acceleration, movement, or other aspects of a motion. The positions of the device are tracked over time and mapped to a gesture model. For example, in the case of a glove, position sensors may be placed at various points along each finger, the palm, and the wrist, to detect position over time. Using sensor position readings, the person's motion may be obtained and mapped to gesture templates in order to determine whether the person performed a recognizable gesture.

An "air gesture" is a movement in free space by a person moving their arm, hands, fingers, or some combination of these on one or both arms. The air gesture may also be performed with ones legs, or combinations of arms and legs. The term air gesture is used to distinguish such gestures from gestures that are performed on a touchscreen (e.g., pinch and zoom gestures). Examples of air gestures used to create music include a flat palm striking movement, a closed first striking movement, a foot toe tap, a foot heel tap, or the like. Such movements may be detected, for example, by sensing a large acceleration and then sudden deceleration, which mimics a striking or hitting motion in Gestures are used in some systems to create music. For example, using a pair of gesture gloves, a person may be able to perform music with a virtual guitar, strumming the strings and mimicking the chord finger positions. Another example use case is for percussion instruments where a person may play a virtual drum set by mimicking tap s in the air. Other instruments are also reproducible using gestures. In addition, gestures may be used independent of any virtual instrument to create music solely from the gesture itself. In this case, the user does not mimic playing a guitar or piano, but instead creates a tone by making a certain air gesture. In such an implementation though, there is no standard music notation. What is needed is a system and method to create standard music notation for air gesture music performances. Such a system is quite useful for introducing one to music or music instruction. Similar notations may be developed for dance and other performance arts.

FIG. 1 illustrates musical notation for gesture-based composition, according to an embodiment. A number of notations 100 and corresponding movements 102 are illustrated in FIG. 1. The notations 100 are useful because they are easy to understand and intuitive. The notations 100 in FIG. 1 are based on the understanding that they represent the user's right hand. Alternative notations may be used for the left hand. The shaded area of the circle in a particular notation 100 indicates the directionality of the gesture. For example, the notation 104 for a downward palm tap (e.g., where the user's hand is flat with the palm facing the ground), shows a shaded area on the bottom half of the circle, indicating that the user should make a downward air gesture. With the hand in the same, position (e.g., flat with palm facing the ground), the user may also perform a knife tap right air gesture, which is indicated by a right-facing triangle notation 106. The knife tap motion may also be referred to as a knife strike, karate chop, knife hand, or other descriptions, but in general refers to the user motioning in a short movement that leads with the ridge of the hand proximate to the little finger (e.g., pinky). In the case of the triangle-shaped knife tap air gestures, directionality is indicated by the direction of the long edges, and is very useful in its intuitive and easy to understand representation.

Figure 2:
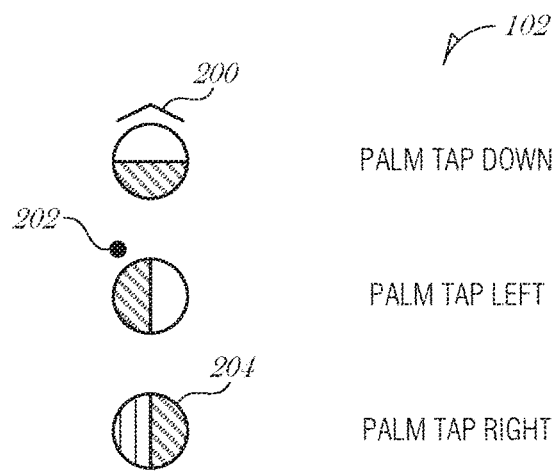
FIG. 2 illustrates another version of musical notation for gesture-based composition, according to an embodiment.

FIG. 2 illustrates another version of musical notation for gesture-based composition, according to an embodiment. To accommodate left hand notation, there may be accents or modifications to the notations 100 illustrated in FIG. 1. Accents or modifications illustrated in FIG. 2 include a "hat" symbol 200 positioned above the notations to indicate that the user is to perform the gesture with their left hand, a dot 202, or a different color (e.g., notation 204). Other modifications or accents may be used to distinguish right and left hand gestures.

Figure 3:
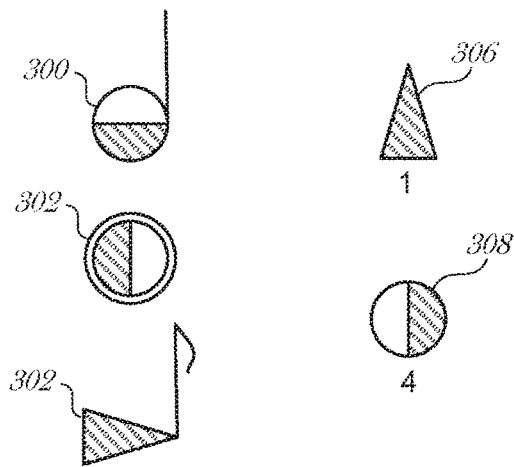
FIG. 3 illustrates additional aspects of musical notation for gesture-based composition, according to an embodiment.

FIG. 3 illustrates additional aspects of musical notation for gesture-based composition, according to an embodiment. As with conventional musical notation, note duration may be expressed with various other accents or modifications to a gesture notation. For instance, in conventional music notations, a stem is included on a solid dot to indicate a quarter note, a hooked stem is used to indicate an eighth note, and a double hooked stem is used to indicate a sixteenth note. Further, in conventional music notation, a whole note is indicated with a ring with no stem, and a half note is indicated with a ring having a stem.

For gesture-based notation, similar stems and modifications may be used. FIG. 3 illustrates a quarter note downward palm tap 300, a whole note left palm tap 302, and an eighth note knife tap right 304. Alternatively, the number of beats to hold a note may be indicated with numbers positioned near the notation. For instance, FIG. 3 illustrates a quarter note knife tap up 306 and a whole note palm tap right 308 with numbers indicating how long a note is to be produced.

Figure 4:
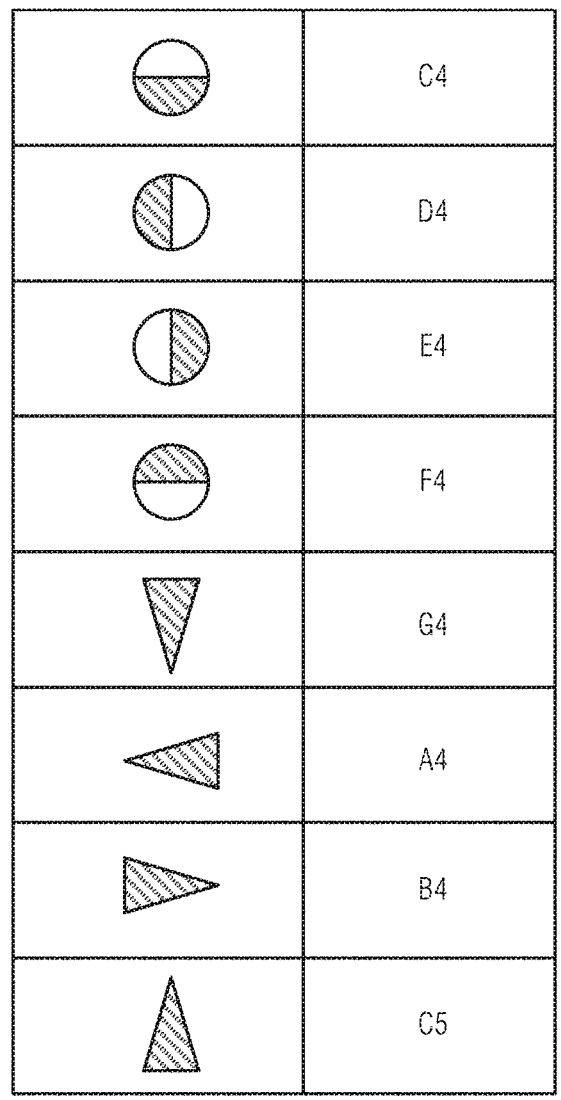
FIG. 4 is a chart illustrating a mapping between air gesture notations and music notes, according to an embodiment.

FIG. 4 is a chart 400 illustrating a mapping between air gesture notations and music notes, according to an embodiment. Music notes may he stored in conventional piano octave notation, where "C4" indicates a middle C or a C in the 4th octave on the piano. While the chart 400 uses mappings to piano note notation, it is understood that other musical indicators may be used. Further, while the chart 400 includes eight mappings from the eight hand gestures of the right hand, it is understood that gestures (e.g., left hand air gestures may be mapped to additional notes, overlapping ranges, chords, or the like. In this way, the left hand may act as harmony to the right hand's melody line. Additionally, while a major scale is illustrated in FIG. 4, it is understood that the intervals between notes may be used to provide a major or minor scale, arpeggio scales, or any other combination of notes. Additionally, multiple air gestures may be mapped to the same note, which may provide convenience for certain performances. Additionally, not every gesture may be mapped to a note. For example, depending on the sensing devices and the methods used to distinguish gestures, distinguishing from a knife tap up and palm tap right may be difficult. As such, the knife strike up gesture may be left unmapped or may be mapped to the same note as the palm tap right.

Figure 5:
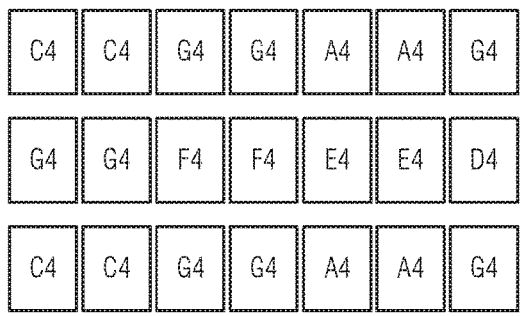
FIG. 5 illustrates a song in piano notation and the corresponding air gestures, according to an embodiment.
Figure 5:
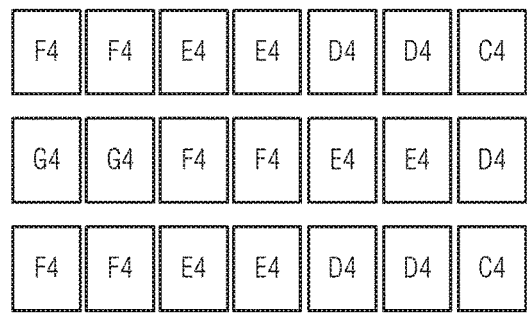
Figure 5:
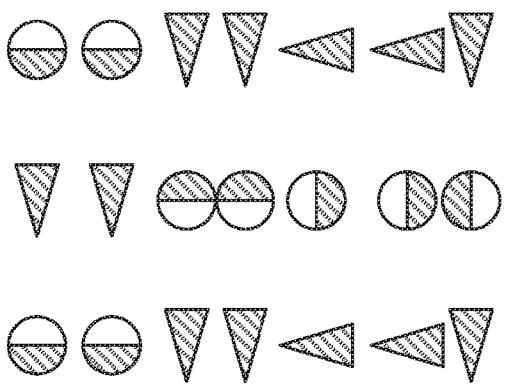
Figure 5:
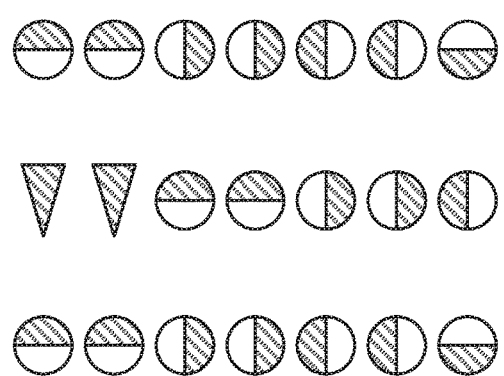

FIG. 5 illustrates a song 500 in piano notation and the corresponding air gestures 550, according to an embodiment. The song 500 is "Twinkle Twinkle Little Star," a popular nursery lullaby. The corresponding air gestures 550 are intuitive and easy to perform. This type of arrangement may be used for music composition, instruction, or discovery. It may also be useful for speech impaired or people with speed disorders to communicate with others.

Using a gesture sensing device along with the gesture notations enables the possibility of learning music in a whole new and innovative way. This system provide musical learning to young minds in very early age as there are no bulky or expensive musical instruments required. Essentially any musical instrument MIDIs may be mapped to the gestures to allow a child/user to discover his/her liking for a musical instrument. MIDI for conventional instruments, farm animal sounds, vocals, and the like may be used to further education and creativity.

Figure 6:
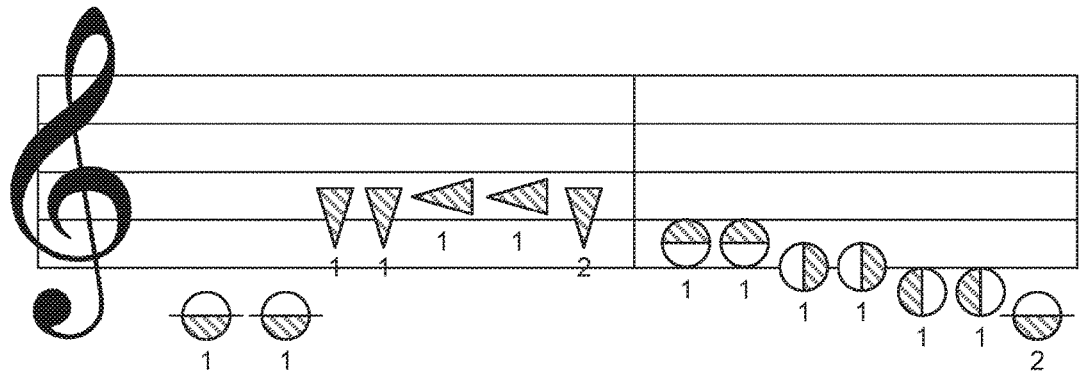
FIG. 6 illustrates the song of FIG. 5 in staff notation with air gesture notations, according to an embodiment.
Figure 6:
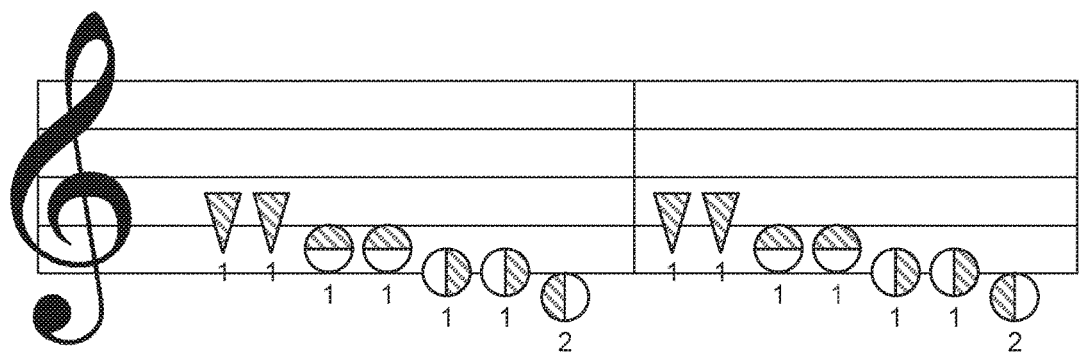
Figure 6:
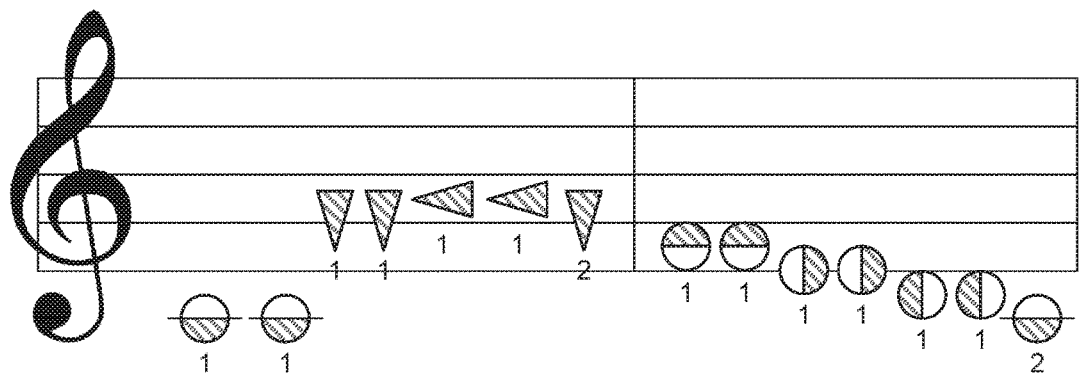

While conventional staff notation is not needed for musical arrangements in air gesture notation, adding the staves may provide additional learning modes and may also provide a way for people used to traditional music notation to follow along. As such, FIG. 6 illustrates the song 500 of FIG. 5 in staff notation with air gesture notations, according to an embodiment. In the example illustrated in FIG. 6, the length of each note is indicated with numerals under the note. This allows the song 500 to be reproduced more accurately. An optional left hand staff may be, presented below the staff illustrated in FIG. 6, which may be used to compose accompaniment (e.g., harmony) music.

Figure 7:
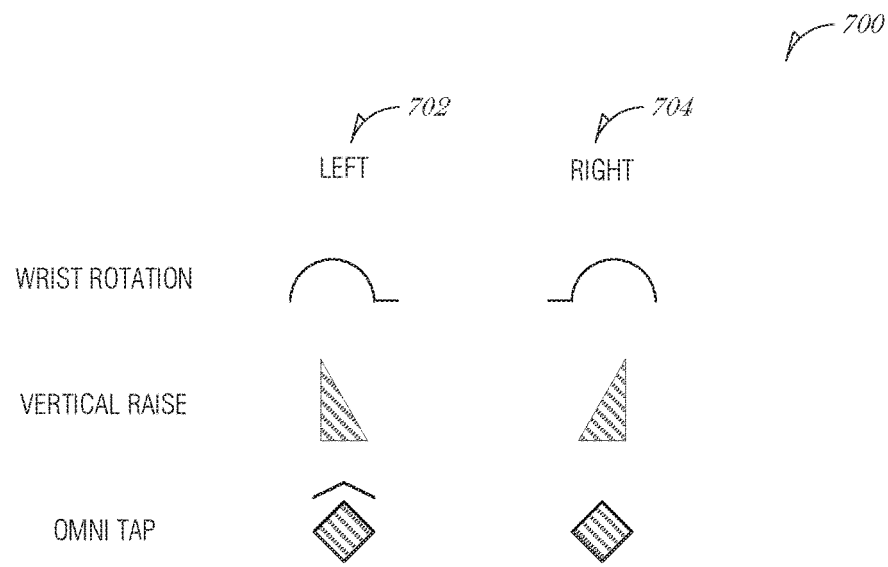
FIG. 7 illustrates dance notation for gesture-based composition, according to an embodiment.
Figure 8:
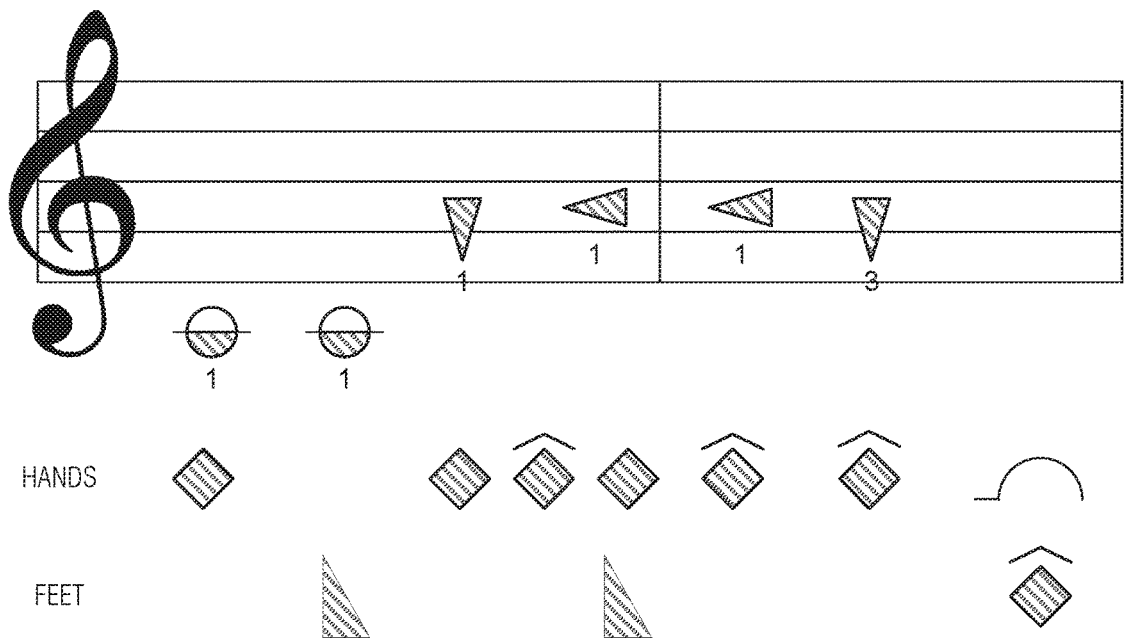
FIG. 8 is an example of air gesture notations for music and dance, according to an embodiment.

FIG. 7 illustrates dance notation 700 for gesture-based composition, according to an embodiment. Air gestures may be detected at the wrist, arm, legs, feet, head, etc. In addition to using air gestures to trigger a sound playback, or compose musical notation, air gestures may be used to choreograph dance movements. The dance notation 700 includes notations for left 702 and right 704, arms or legs. A wrist rotation dance movement is a quick rotation of one or both wrists. A vertical raise is a leg raise from a relatively low position to a relatively high position (e.g., from a standing position to kicking a foot up to waist level). An omni tap is a quick tapping motion in any direction with a hand/wrist or foot/ankle. FIG. 8 is an example of air gesture notations for music and dance, according to an embodiment. One person may perform the music on the music staff and another may perform the dance illustrated in the dance chart. Optionally, one person may perform both music and dance simultaneously.

In an example, gesture detection techniques are performed using sensors on a wearable device. These techniques may provide low-latency and robust detection of gestures for a wearable musical instrument. Raw data from a device sensor (e.g., an accelerometer, a gyroscope, or a magnetometer) implemented in a wearable device, such as a wrist-worn device, may be used to capture body motion. In the wrist-worn device, the device may be worn on the wrist or palm. Other types of wearable devices may include devices worn on an ankle, forearm, or the like.

Different types of gestures may be detected, such as tap-type gestures that correspond to specific sudden movements in a particular direction or sudden rotation about a specific axis. In an example, the systems and methods described herein may use sensors on a wrist-worn device to obtain an estimate of the wrist and forearm orientation. Similarly, an ankle-worn device may be used to capture foot or leg position or orientation. Alternatively, or optionally, camera-based sensors may be used to detection motion and resulting gestures.

Figure 9:
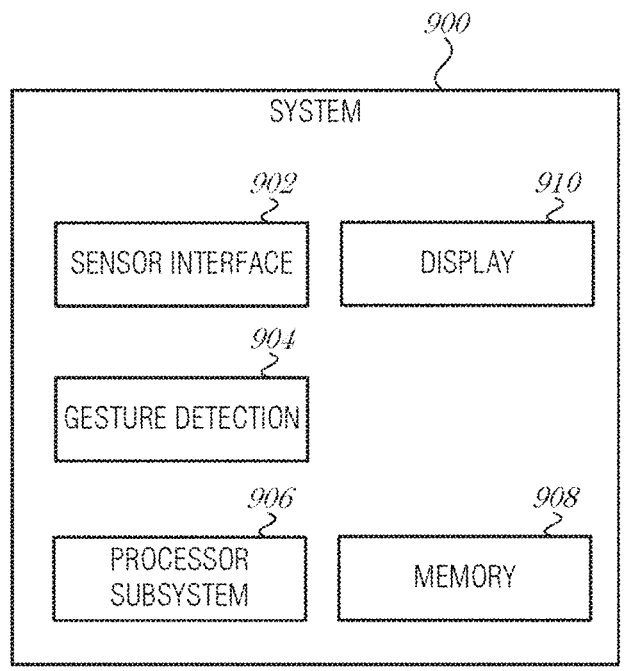
FIG. 9 is a block diagram illustrating a composing system 900, according to an embodiment.

FIG. 9 is a block diagram illustrating a system 900, according to an embodiment. The system 900 may be configured to perform any of the methods described in this document, or combinations thereof.

The system 900 includes a sensor interface 902, a gesture detection processor 904, a processor subsystem 906, a memory 908, and a display 910. The sensor interface 902 may be used to interface with various components that may be worn by a user (e.g., a bracelet or glove), held by a user (e.g., a remote control), or that observe a user (e.g., a camera array). The gesture detection processor 904 may use date received from the sensor interface 902 to analyze sensor data (e.g., with the use of a machine learning algorithm) to classify and detect a gesture. The display 910 may be any type of visual output system including, but not limited to a computer monitor, television, projection system, heads-up display (HMD), tablet screen, or the like.

Examples of Using the System for Composition

The system 900 may be used to compose gesture-based compositions. As such, in an embodiment, the memory 908 may include instructions, which when executed by the processor subsystem 906, cause the processor subsystem to 906 receive an indication of an air gesture performed by a user, reference a mapping of air gestures to air gesture notations to identify an air gesture notation corresponding to the air gesture, and store an indication of the air gesture notation in a memory of the computerized composition system.

In an embodiment, to receive the indication of the air gesture, the processor subsystem 904 is to receive sensor data via a sensor interface circuit, from a sensor worn by the user. In a related embodiment, the sensor is integrated into a bracelet, a glove, an anklet, or a shoe. In a related embodiment, the indication of the air gesture is provided by a gesture detection processor 904.

In an embodiment, to receive the indication of the air gesture, the processor subsystem 906 is to receive image data from a camera observing the user. In a further embodiment, the image data comprises depth image information. In an embodiment, the image data comprises visible light image information.

In an embodiment, the mapping of air gestures comprises a mapping of air gesture notations to musical tones. In a further embodiment, the mapping of air gestures comprises a mapping of air gesture notations to dance movements.

In an embodiment, the air gesture notation indicates a directionality of the air gesture. In an embodiment, the air gesture notation comprises a circle with a shaded portion, the shaded portion indicating a directionality of the air gesture. In a further embodiment, the shaded portion indicates a palm tap air gesture.

In an embodiment, the air gesture notation comprises a non-equilateral triangle indicating a directionality of the air gesture. In a further embodiment, the non-equilateral triangle indicates a knife tap air gesture.

In an embodiment, the air gesture notation comprises a modifier that alters the air gesture notation. In a further embodiment, the modifier comprises a hat symbol oriented over the air gesture notation, the hat symbol indicating that performance of a second air gesture is performed simultaneously with the air gesture. In a related embodiment, the hat symbol indicates that the user perform a foot gesture as the second air gesture. In a related embodiment, the hat symbol indicates that a musical note is modified from the air gesture notation without the hat symbol. In a further embodiment, the musical note is modified with a sharp. In a related embodiment, the musical note is modified with a flat.

In another embodiment, the modifier comprises a dot symbol oriented over the air gesture notation, the dot symbol indicating that performance of a second air gesture is performed simultaneously with the air gesture. In a further embodiment, the dot symbol indicates that a musical note is modified from the air gesture notation without the dot symbol. In an embodiment, the musical note is modified with a sharp. In a related embodiment, the musical note is modified with a flat.

In an embodiment, the air gesture notation indicates a handedness of the air gesture. In a further embodiment, the air gesture notation is in a first color for a right hand performance of the air gesture, and the air gesture notation is in a second color for a left hand performance of the air gesture, the first and second colors being different colors. In a related embodiment, the air gesture notation is presented on a plurality of staffs, the plurality of staffs including a first staff for right hand air gesture notations, and a second staff for left hand air gesture notations.

In an embodiment, the processor subsystem 906 is to present a plurality of air gesture notations in a musical arrangement. In a further embodiment, to present the plurality of air gesture notations, the processor subsystem 906 is to present the plurality of air gesture notations on a musical staff. In a related embodiment, to present the plurality of air gesture notations, the processor subsystem 96 is to present the plurality of air gesture notations without a musical staff. In a further embodiment, to present the plurality of air gesture notations, the processor subsystem 906 is to present a first set of the plurality of air gesture notations and a second set of the plurality of air gesture notations, the first set indicating musical arrangement and the second set indicating dance choreography, the first and second set of air gesture notations coordinated in time.

The system 900 may also be used to create air gesture notation from other input. For example, the system 900 may receive input from a musical instrument, such as an electronic keyboard, that represents notes. The musical notes may then be translated into air gesture notations based on a previously-arranged mapping between notes and gestures. Other types of input may be received, such as a musical score that includes the notes in a conventional staff notation. Additionally, other types of instruments may be used, or other types of input detection modes. For example, a trumpet may be played into a microphone that is coupled to the system 900, the sensor interface 902 may detect the note being played by the trumpet and the processor subsystem 906 may determine a corresponding air gesture notation from a mapping stored in memory 908. Other embodiments are discussed below.

In an embodiment, the processor subsystem 906 is to receive, at a computerized composition system, an indication of a musical note; reference a mapping of musical notes to air gesture notations to identify an air gesture notation corresponding to the musical note; and store an indication of the air gesture notation in a memory of the computerized composition system.

In an embodiment, to receive the indication of the musical note, the processor subsystem 906 is to receive musical information from a musical instrument.

In an embodiment, to receive the indication of the musical note, the processor subsystem 906 is to read e a musical score.

In an embodiment, the processor subsystem 906 is to present a plurality of air gesture notations in a musical arrangement. For example, the processor subsystem 906 may output a score similar to that illustrated in FIG. 5, 6, or 8.

Examples of Using the System for Instruction

In addition to being used for composition, the system 900 may be used for instruction or musical exploration. One example embodiment uses a play-along or sing-along model, where the user is presented an arrangement of air gesture notations and follows along with the notations to recreate the song. As the notations are displayed, they may be highlighted with a marker (e.g., a bouncing ball or an underlining effect, etc.) to show the user the position of the song. The playback may be "gamified". In other words, game play aspects may be incorporated into the playback to encourage and challenge the user. Game aspects may include, among others, point tracking, person-to-person challenges, personal achievements, scoring, awards, online scoreboards, and the like.

In an embodiment, the processor subsystem 906 is to present a plurality of air gesture notations in a musical arrangement, receive an indication of an air gesture performed by a user, reference a mapping of air gestures to air gesture notations to identify an air gesture notation corresponding to the air gesture, and guide the user through the musical arrangement by sequentially highlighting the air gesture notations in the musical arrangement based on the mapping of air gestures to air gesture notations.

In an embodiment, to present the plurality of air gesture notations, the processor subsystem 906 is to present the plurality of air gesture notations on a musical staff. In a further embodiment, to present the plurality of air gesture notations, the processor subsystem 906 is to present the plurality of air gesture notations without a musical staff. In a related embodiment, to present the plurality of air gesture notations, the processor subsystem 906 is to present a first set of the plurality of air gesture notations and a second set of the plurality of air gesture notations, the first set indicating musical arrangement and the second set indicating dance choreography, the first and second set of air gesture notations coordinated in time.

In an embodiment, to receive the indication of the air gesture, the processor subsystem 906 is to receive sensor data from a sensor worn by the user. In a further embodiment, the sensor is integrated into a bracelet, a glove, an anklet, or a shoe. In a related embodiment, the indication of the air gesture is provided by a gesture detection processor 904.

In an embodiment, to receive the indication of the air gesture, the processor subsystem 906 is to receive image data from a camera observing the user. In a further embodiment, the image data comprises depth image information. In a related embodiment, the image data comprises visible light image information.

In an embodiment, the mapping of air gestures comprises a mapping of air gesture notations to musical tones. In a related embodiment, the mapping of air gestures comprises a mapping of air gesture notations to dance movements.

In an embodiment, the air gesture notation indicates a directionality of the air gesture. In a related embodiment, the air gesture notation comprises a circle with a shaded portion, the shaded portion indicating a directionality of the air gesture. In a further embodiment, the shaded portion indicates a palm tap air gesture.

In an embodiment, the air gesture notation comprises a non-equilateral triangle indicating a directionality of the air gesture. In a further embodiment, the non-equilateral triangle indicates a knife tap air gesture.

In an embodiment, the air gesture notation comprises a modifier that alters the air gesture notation. In a further embodiment, the modifier comprises a hat symbol oriented over the air gesture notation, the hat symbol indicating that performance of a second air gesture is performed simultaneously with the air gesture. In a related embodiment, the hat symbol indicates that the user perform a foot gesture as the second air gesture. In a related embodiment, the hat symbol indicates that a musical note is modified from the air gesture notation without the hat symbol. In a related embodiment, the musical note is modified with a sharp. In a related embodiment, the musical note is modified with a flat.

In an embodiment, the modifier comprises a dot symbol oriented over the air gesture notation, the dot symbol indicating that performance of a second air gesture is performed simultaneously with the air gesture. In a further embodiment, the dot symbol indicates that a musical note is modified from the air gesture notation without the dot symbol. In an embodiment, the musical note is modified with a sharp. In an embodiment, the musical note is modified with a flat.

In an embodiment, the air gesture notation indicates a handedness of the air gesture. In a further embodiment, the air gesture notation is in a first color for a right hand performance of the air gesture, and the air gesture notation is in a second color for a left hand performance of the air gesture, the first and second colors being different colors. In a related embodiment, the air gesture notation is presented on a plurality of staffs, the plurality of staffs including a first staff for right hand air gesture notations, and a second staff for left hand air gesture notations.

Figure 10:
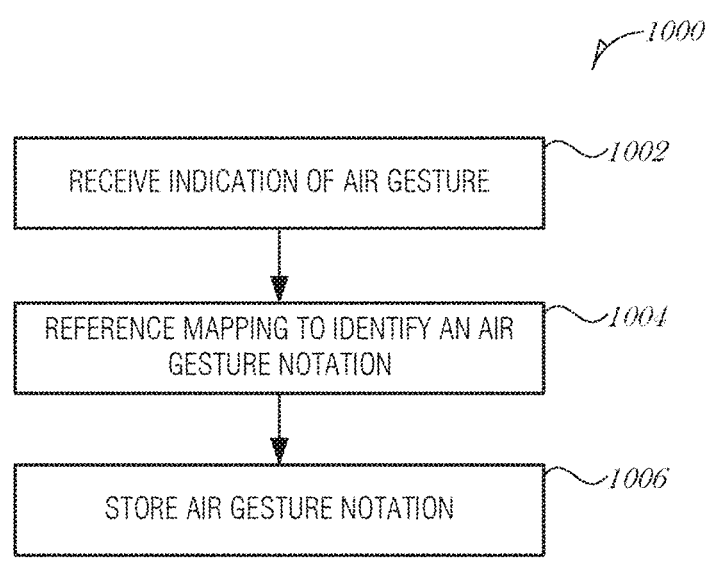
FIG. 10 is a flowchart illustrating a method for composing gesture-based performances, according to an embodiment.

FIG. 10 is a flowchart illustrating a method 1000 for composing gesture-based performances, according to an embodiment. At block 1002, an indication of an air gesture performed by a user is received at a computerized composition system. In an embodiment, receiving the indication of the air gesture comprises receiving sensor data from a sensor worn by the user. In an embodiment, the sensor is integrated into a bracelet, a glove, an anklet, or a shoe.

In an embodiment, the indication of the air gesture is provided by a gesture detection processor. The gesture detection processor may implement various machine learning algorithms to determine from sensor values whether a user performed a gesture, and if so, which gesture. In an embodiment, receiving the indication of the air gesture comprises receiving image data from a camera observing the user. Image data may be analyzed by a gesture detection processor, for example. In an embodiment, the image data comprises depth image information. In a related embodiment, the image data comprises visible light image information.

At block 1004, a mapping of air gestures to air gesture notations is referenced to identify an air gesture notation corresponding to the air gesture. In an embodiment, the mapping of air gestures comprises a mapping of air gesture notations to musical tones. In an embodiment, the mapping of air gestures comprises a mapping of air gesture notations to dance movements.

At block 1006, an indication of the air gesture notation is stored in a memory of the computerized composition system.

In an embodiment, the air gesture notation indicates a directionality of the air gesture. In a further embodiment, the air gesture notation comprises a circle with a shaded portion, the shaded portion indicating a directionality of the air gesture. In a further embodiment, wherein the shaded portion indicates a palm tap air gesture.

In an embodiment, the air gesture notation comprises a non-equilateral triangle indicating a directionality of the air gesture. In a further embodiment, the non-equilateral triangle indicates a knife tap air gesture.

In an embodiment, the air gesture notation comprises a modifier that alters the air gesture notation. In a further embodiment, the modifier comprises a hat symbol oriented over the air gesture notation, the hat symbol indicating that performance of a second air gesture is performed simultaneously with the air gesture.

In another embodiment, the hat symbol indicates that the user perform a foot gesture as the second air gesture. The foot gesture may be raising a toe of the foot. The foot gesture in combination with the hand gesture may alter the tone that is output. For example, a standard hand air gesture of palm hit right may cause the output of a G4 tone, but with the foot gesture, a G4# is output instead. The foot gesture may be used to always raise a tone by a half-step (e.g., semitone), or lower the tone by a half-step, or other tonal modifications. As such, in an embodiment, the hat symbol indicates that a musical note is modified from the air gesture notation without the hat symbol. In a further embodiment, the musical note is modified with a sharp. In a further embodiment, the musical note is modified with a flat.

Other symbols may be used instead of a hat symbol to raise/lower the pitch. Thus, in an embodiment, the modifier comprises a dot symbol oriented over the air gesture notation, the dot symbol indicating that performance of a second air gesture is performed simultaneously with the air gesture. In a further embodiment, the dot symbol indicates that a musical note is modified from the air gesture notation without the dot symbol. In a further embodiment, the musical note is modified with a sharp. In an embodiment, the musical note is modified with a flat.

Right and left handedness may also be indicated in the notation. In an embodiment, the air gesture notation indicates a handedness of the air gesture. In a further embodiment, the air gesture notation is in a first color for a right hand performance of the air gesture, and the air gesture notation is in a second color for a left hand performance of the air gesture, the first and second colors being different colors.

In another embodiment, the air gesture notation is presented on a plurality of staffs, the plurality of staffs including a first staff for right hand air gesture notations, and a second staff for left hand air gesture notations.

The method 1000 may further include comprising presenting a plurality of air gesture notations in a musical arrangement. In a further embodiment, presenting the plurality of air gesture notations comprises presenting the plurality of air gesture notations on a musical staff. In another embodiment, presenting the plurality of air gesture notations comprises presenting the plurality of air gesture notations without a musical staff. In an embodiment, presenting the plurality of air gesture notations comprises presenting a first set of the plurality of air gesture notations and a second set of the plurality of air gesture notations, the first set indicating musical arrangement and the second set indicating dance choreography, the first and second set of air gesture notations coordinated in time.

Figure 11:
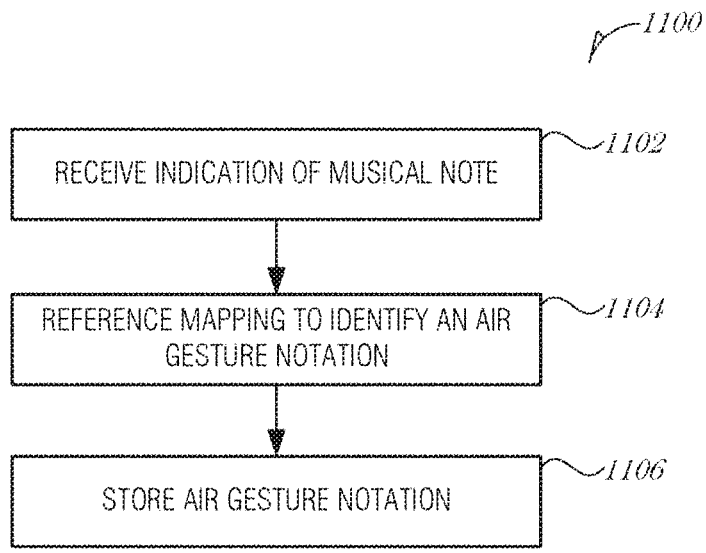
FIG. 11 is a flowchart illustrating a method for composing gesture-based performances, according to an embodiment.

FIG. 11 is a flowchart illustrating a method 1100 for composing gesture-based performances, according to an embodiment. Instead of detecting an air gesture to create the air gesture notation, a conventional musical note may be received and used to create the score of air gesture notations. For instance, a composer may use a keyboard to play a series of notes, which are captured and then used to create a composition of air gesture notations. As such, method 1100 includes receiving, at a computerized composition system, an indication of a musical note (operation 1102).

At block 1104, a mapping of musical notes to air gesture notations to is referenced identify an air gesture notation corresponding to the musical note.

At block 1106, an indication of the air gesture notation is stored in a memory of the computerized composition system.

In an embodiment, receiving the indication of the musical note comprises receiving musical information from a musical instrument. The musical instrument may be a piano, keyboard, trumpet, voice, hells, or the like.

Alternatively, the system may read existing sheet music and translate it into air gesture notation. Thus, in an embodiment, receiving the indication of the musical note comprises reading a musical score.

In an embodiment, the method 1100 includes presenting a plurality of air gesture notations in a musical arrangement.

Figure 12:
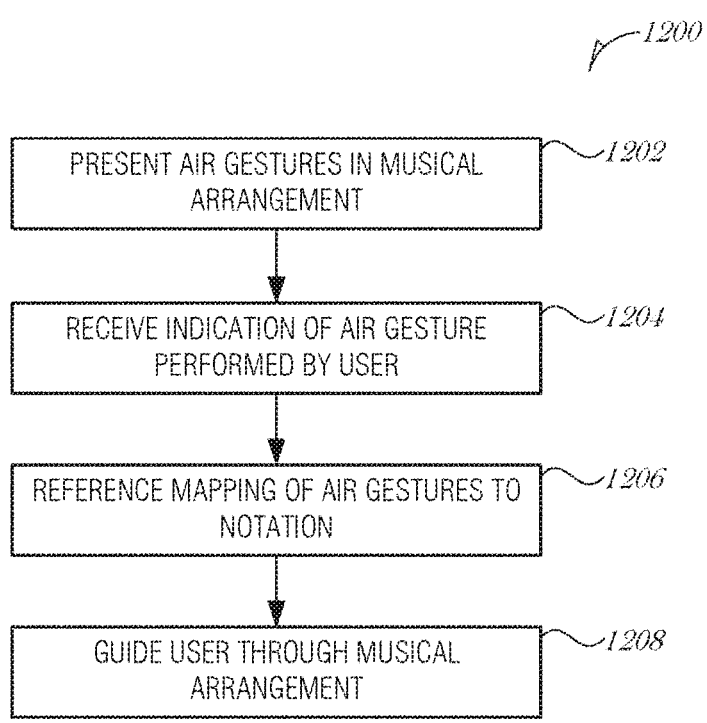
FIG. 12 is a flowchart illustrating a method for instructing gesture-based performances, according to an embodiment.

FIG. 12 is a flowchart illustrating a method 1200 for instructing gesture-based performances, according to an embodiment. Gesture-based notation is powerful tool for learning and exploring music theory. A system may present a visual score to a person who is equipped with wearable sensors, or is in a field of view of a camera system, for example. As the system scrolls or progresses through a musical score, the user may perform the gestures indicated in the air gesture notation. This sing-along type of activity acts as a musical reinforcement and provides deep entertainment.

The method 1200 begins at block 1202, wherein a plurality of air gesture notations are presented in a musical arrangement. The air gesture notations may be presented on a computer display, television, handheld device, or the like.

At block 1204, an indication of an air gesture performed by a user is received, at a computerized system. In an embodiment, receiving the indication of the air gesture comprises receiving sensor data from a sensor worn by the user.

In an embodiment, the sensor is integrated into a bracelet, a glove, an anklet, or a shoe.

In an embodiment, the indication of the air gesture is provided by a gesture detection processor.

In an embodiment, receiving the indication of the air gesture comprises receiving image data from a camera observing the user. In an embodiment, the image data comprises depth image information. In an embodiment, the image data comprises visible light image information.

At block 1206, a mapping of air gestures to air gesture notations is referenced to identify an air gesture notation corresponding to the air gesture. In an embodiment, the mapping of air gestures comprises a mapping of air gesture notations to musical tones. In an embodiment, the mapping of air gestures comprises a mapping of air gesture notations to dance movements.

At block 1208, the user is guided through the musical arrangement by sequentially highlighting the air gesture notations in the musical arrangement based on the mapping of air gestures to air gesture notations. In an embodiment, presenting the plurality of air gesture notations comprises presenting the plurality of air gesture notations on a musical staff. In an embodiment, presenting the plurality of air gesture notations comprises presenting the plurality of air gesture notations without a musical staff.

In an embodiment, presenting the plurality of air gesture notations comprises presenting a first set of the plurality of air gesture notations and a second set of the plurality of air gesture notations, the first set indicating musical arrangement and the second set indicating dance choreography, the first and second set of air gesture notations coordinated in time.

In an embodiment, the air gesture notation indicates a directionality of the air gesture.

In an embodiment, the air gesture notation comprises a circle with a shaded portion, the shaded portion indicating a directionality of the air gesture. In a further embodiment, the shaded portion indicates a palm tap air gesture.

In an embodiment, the air gesture notation comprises a non-equilateral triangle indicating a directionality of the air gesture. In a further embodiment, the non-equilateral triangle indicates a knife tap air gesture.

In an embodiment, the air gesture notation comprises a modifier that alters the air gesture notation. In a further embodiment, the modifier comprises a hat symbol oriented over the air gesture notation, the hat symbol indicating that performance of a second air gesture is performed simultaneously with the air gesture. In a related embodiment, the hat symbol indicates that the user perform a foot gesture as the second air gesture. In a related embodiment, the hat symbol indicates that a musical note is modified from the air gesture notation without the hat symbol. In a further embodiment, the musical note is modified with a sharp. In a related embodiment, the musical note is modified with a flat.

In a related embodiment, the modifier comprises a dot symbol oriented over the air gesture notation, the dot symbol indicating that performance of a second air gesture is performed simultaneously with the air gesture. In a further embodiment, the dot symbol indicates that a musical note is modified from the air gesture notation without the dot symbol. In a further embodiment, the musical note is modified with a sharp. In a further embodiment, the musical note is modified with a flat.

In an embodiment, the air gesture notation indicates a handedness of the air gesture. In a further embodiment, the air gesture notation is in a first color for a right hand performance of the air gesture, and the air gesture notation is in a second color for a left hand performance of the air gesture, the first and second colors being different colors.

In an embodiment, the air gesture notation is presented on a plurality of staffs, the plurality of staffs including a first staff for right hand air gesture notations, and a second staff for left hand air gesture notations.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 13:
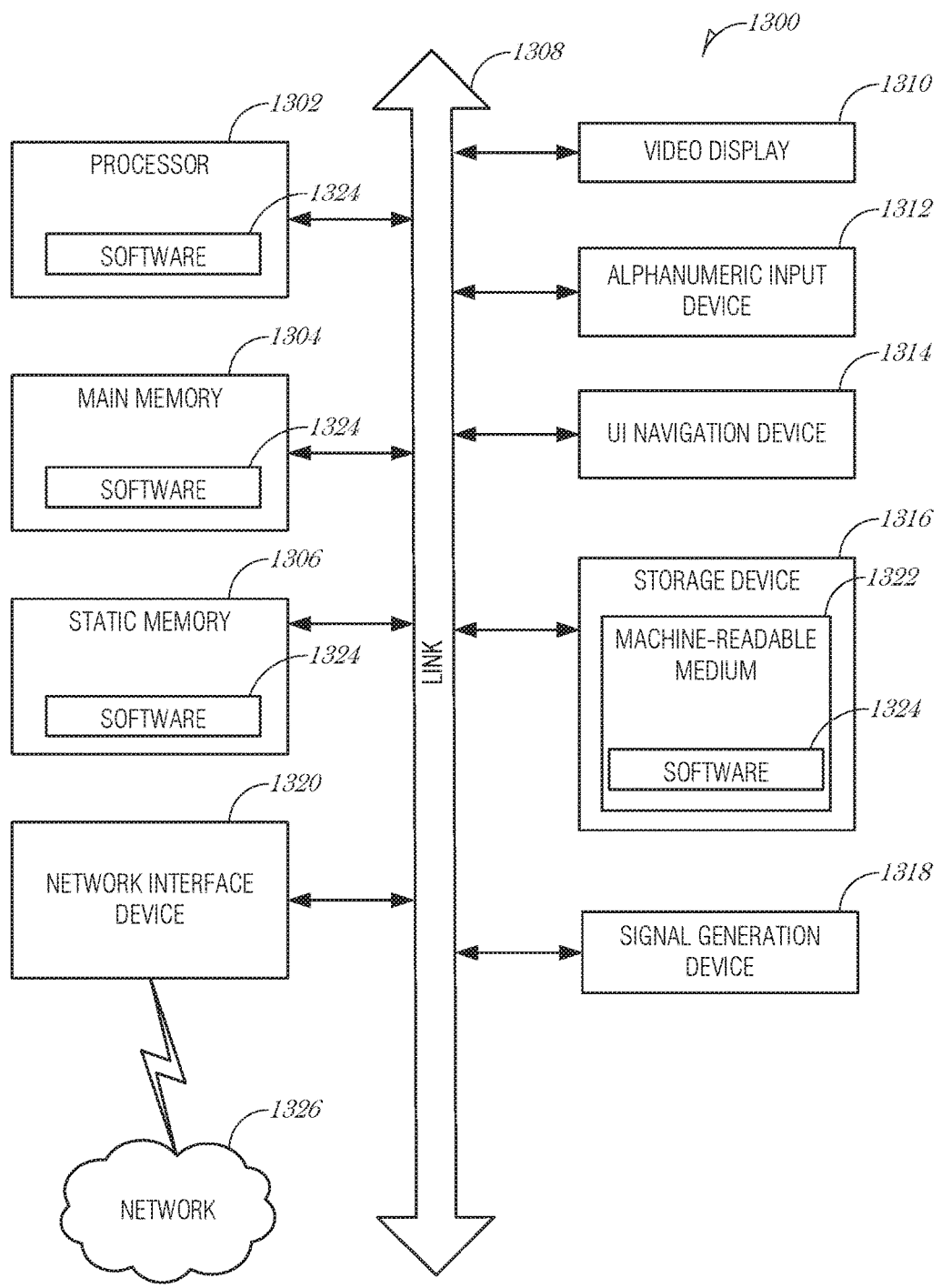
FIG. 13 is a block diagram illustrating an example machine upon which any one or more of the techniques (e.g., methodologies) discussed herein may perform, according to an example embodiment.

FIG. 13 is a block diagram illustrating a machine in the example form of a computer system 1300, within which a set or sequence of instructions may be executed to cause the machine to perform any one of the methodologies discussed herein, according to an example embodiment. In alternative embodiments, the machine operates as a standalone device or may be connected (e.g., networked) to other machines, in a networked deployment, the machine may operate in the capacity of either a server or a client machine in server-client network environments, or it may act as a peer machine in peer-to-peer (or distributed) network environments. The machine may be a drone, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, die term "processor-based system" shall be taken to include any set of one or more machines that are controlled by or operated by a processor (e.g., a computer) to individually or jointly execute instructions to perform any one or more of the methodologies discussed herein.

Example computer system 1300 includes at least one processor 1302 (e.g., a processor subsystem, a central processing unit (CPU), a graphics processing unit (GPU) or both, processor cores, compute nodes, etc.), a main memory 1304 and a static memory 1306, which communicate with each other via a link 1308 (e.g., bus). The computer system 1300 may further include a video display unit 1310, an alphanumeric input device 1312 (e.g., a keyboard), and a user interface (UI) navigation device 1314 (e.g., a mouse). In one embodiment, the video display unit 1310, input device 1312 and UI navigation device 1314 are incorporated into a touch screen display. The computer system 1300 may additionally include a storage device 1316 (e.g., a drive unit), a signal generation device 1318 (e.g., a speaker), a network interface device 1320, and one or more sensors (not shown), such as a global positioning system (GPS) sensor, compass, accelerometer, pyrometer, magnetometer, or other sensor.

The storage device 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304, static memory 1306, and/or within the processor 1302 during execution thereof by the computer system 1300, with the main memory 1304, static memory 1306, and the processor 1302 also constituting machine-readable media.

While the machine-readable medium 1322 is illustrated in an example embodiment to be a single medium, the term "machine-readable medium" may include a single medium or multiple media (e.g., a centralized or distributed database, and/or associated caches and servers) that store the one or more instructions 1324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1324 may further be transmitted or received over a communications network 1326 using a transmission medium via the network interface device 1320 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks) The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a computerized composition system for composing gesture-based performances, the system comprising: a processor subsystem; and memory including instructions, which when executed by the processor subsystem, cause the processor subsystem to: receive an indication of an air gesture performed by a user; reference a mapping of air gestures to air gesture notations to identify an air gesture notation corresponding to the air gesture; and store an indication of the air gesture notation in a memory of the computerized composition system.

In Example 2, the subject matter of Example 1 optionally includes wherein to receive the indication of the air gesture, the processor subsystem is to receive sensor data via a sensor interface circuit, from a sensor worn by the user.

In Example 3, the subject matter of Example 2 optionally includes wherein the sensor is integrated into a bracelet, a glove, an anklet, or a shoe.

In Example 4, the subject matter of any one or more of Examples 2-3 optionally include wherein the indication of the air gesture is provided by a gesture detection processor.

In Example 5, the subject matter of any one or more of Examples 1-4 optionally include wherein to receive the indication of the air gesture, the processor subsystem is to receive image data from a camera observing the user.

In Example 6, the subject matter of Example 5 optionally includes wherein the image data comprises depth image information.

In Example 7, the subject matter of any one or more of Examples 5-6 optionally include wherein the image data comprises visible light image information.

In Example 8, the subject matter of any one or more of Examples 1-7 optionally include wherein the flapping of air gestures comprises a mapping of air gesture notations to musical tones.

In Example 9, the subject matter of any one or more of Examples 1-8 optionally include wherein the mapping of air gestures comprises a mapping of air gesture notations to dance movements.

In Example 10, the subject matter of any one or more of Examples 1-9 optionally include wherein the air gesture notation indicates a directionality of the air gesture.

In Example 11, the subject matter of any one or more of Examples 1-10 optionally include wherein the air gesture notation comprises a circle with a shaded portion, the shaded portion indicating a directionality of the air gesture.

In Example 12, the subject flatter of Example 11 optionally includes wherein the shaded portion indicates a palm tap air gesture.

In Example 13, the subject matter of any one or more of Examples 12 optionally include wherein the air gesture notation comprises a non-equilateral triangle indicating a directionality of the air gesture.

In Example 14, the subject matter of Example 13 optionally includes wherein the non-equilateral triangle indicates a knife tap air gesture.

In Example 15, the subject matter of any one or more of Examples 1-14 optionally include wherein the air gesture notation comprises a modifier that alters the air gesture notation.

In Example 16, the subject matter of Example 15 optionally includes wherein the modifier comprises a hat symbol oriented over the air gesture notation, the hat symbol indicating that performance of a second air gesture is performed simultaneously with the air gesture.

In Example 17, the subject matter of any one or more of Examples 15-16 optionally include wherein the hat symbol indicates that the user perform a foot gesture as the second air gesture.

In Example 18, the subject matter of any one or more of Examples 15-17 optionally include wherein the hat symbol indicates that a musical note is modified from the air gesture notation without the hat symbol.

In Example 19, the subject matter of Example 18 optionally includes wherein the musical note is modified with a sharp.

In Example 20, the subject matter of any one or more of Examples 18-19 optionally include wherein the musical note is modified with a flat.

In Example 21, the subject matter of any one or more of Examples 15-20 optionally include wherein the modifier comprises a dot symbol oriented over the air gesture notation, the dot symbol indicating that performance of a second air gesture is performed simultaneously with the air gesture.

In Example 22, the subject matter of Example 21 optionally includes wherein the dot symbol indicates that a musical note is modified from the air gesture notation without the dot symbol.

In Example 23, the subject matter of Example 22 optionally includes wherein the musical note is modified with a sharp.

In Example 24, the subject matter of any one or more of Examples 22-23 optionally include wherein the musical note is modified with a flat.

In Example 25, the subject matter of any one or more of Examples 1-24 optionally include wherein the air gesture notation indicates a handedness of the air gesture.

In Example 26, the subject matter of Example 25 optionally includes wherein the air gesture notation is in a first color for a right hand performance of the air gesture, and the air gesture notation is in a second color for a left hand performance of the air gesture, the first and second colors being different colors.

In Example 27, the subject matter of any one or more of Examples 25-26 optionally include wherein the air gesture notation is presented on a plurality of staffs, the plurality of staffs including a first staff for right hand air gesture notations, and a second staff for left hand air gesture notations.

In Example 28, the subject matter of any one or more of Examples 1-27 optionally include wherein the processor subsystem is to present a plurality of air gesture notations in a musical arrangement.

In Example 29, the subject matter of Example 28 optionally includes wherein to present the plurality of air gesture notations, the processor subsystem is to present the plurality of air gesture notations on a musical staff.

In Example 30, the subject matter of any one or more of Examples 28-29 optionally include wherein to present the plurality of air gesture notations, the processor subsystem is to present the plurality of air gesture notations without a musical staff.

In Example 31, the subject matter of any one or more of Examples 28-30 optionally include wherein to present the plurality of air gesture notations, the processor subsystem is to present a first set of the plurality of air gesture notations and a second set of the plurality of air gesture notations, the first set indicating musical arrangement and the second set indicating dance choreography, the first and second set of air gesture notations coordinated in time.

Example 32 is a method for composing gesture-based performances, the method comprising: receiving, at a computerized composition system, an indication of an air gesture performed by a user; referencing a mapping of air gestures to air gesture notations to identify an air gesture notation corresponding to the air gesture; and storing an indication of the air gesture notation in a memory of the computerized composition system.

In Example 33, the subject matter of Example 32 optionally includes wherein receiving the indication of the air gesture comprises receiving sensor data from a sensor worn by the user.

In Example 34, the subject matter of Example 33 optionally includes wherein the sensor is integrated into a bracelet, a glove, an anklet, or a shoe.

In Example 35, the subject matter of any one or more of Examples 33-34 optionally include wherein the indication of the air gesture is provided by a gesture detection processor.

In Example 36, the subject matter of any one or more of Examples 32-35 optionally include wherein receiving the indication of the air gesture comprises receiving image data from a camera observing the user.

In Example 37, the subject matter of Example 36 optionally includes wherein the image data comprises depth image information.

In Example 38, the subject matter of any one or more of Examples 36-37 optionally include wherein the image data comprises visible light image information.

In Example 39, the subject matter of any one or more of Examples 32-38 optionally include wherein the mapping of air gestures comprises a mapping of air gesture notations to musical tones.

In Example 40, the subject matter of any one or more of Examples 32-39 optionally include wherein the mapping of air gestures comprises a mapping of air gesture notations to dance movements.

In Example 41, the subject matter of any one or more of Examples 32-40 optionally include wherein the air gesture notation indicates a directionality of the air gesture.

In Example 42, the subject matter of any one or more of Examples 32-41 optionally include wherein the air gesture notation comprises a circle with a shaded portion, the shaded portion indicating a directionality of the air gesture.

In Example 43, the subject matter of Example 42 optionally includes wherein the shaded portion indicates a palm tap air gesture.

In Example 44, the subject matter of any one or more of Examples 32-43 optionally include wherein the air gesture notation comprises a non-equilateral triangle indicating a directionality of the air gesture.

In Example 45, the subject matter of Example 44 optionally includes wherein the non-equilateral triangle indicates a knife tap air gesture.

In Example 46, the subject matter of any one or more of Examples 32-45 optionally include wherein the air gesture notation comprises a modifier that alters the air gesture notation.

In Example 47, the subject matter of Example 46 optionally includes wherein the modifier comprises a hat symbol oriented over the air gesture notation, the hat symbol indicating that performance of a second air gesture is performed simultaneously with the air gesture.

In Example 48, the subject matter of any one or more of Examples 46-47 optionally include wherein the hat symbol indicates that the user perform a foot gesture as the second air gesture.

In Example 49, the subject matter of any one or more of Examples 46-48 optionally include wherein the hat symbol indicates that a musical note is modified from the air gesture notation without the hat symbol.

In Example 50, the subject matter of Example 49 optionally includes wherein the musical note is modified with a sharp.

In Example 51, the subject matter of any one or more of Examples 49-50 optionally include wherein the musical note is modified with a flat.

In Example 52, the subject matter of any one or more of Examples 46-51 optionally include wherein the modifier comprises a dot symbol oriented over the air gesture notation, the dot symbol indicating that performance of a second air gesture is performed simultaneously with the air gesture.

In Example 53, the subject matter of Example 52 optionally includes wherein the dot symbol indicates that a musical note is modified from the air gesture notation without the dot symbol.

In Example 54, the subject matter of Example 53 optionally includes wherein the musical note is modified with a sharp.

In Example 55, the subject matter of any one or more of Examples 53-54 optionally include wherein the musical note is modified with a flat.

In Example 56, the subject matter of any one or more of Examples 32-55 optionally include wherein the air gesture notation indicates a handedness of the air gesture.

In Example 57, the subject matter of Example 56 optionally includes wherein the air gesture notation is in a first color for a right hand performance of the air gesture, and the air gesture notation is in a second color for a left hand performance of the air gesture, the first and second colors being different colors.

In Example 58, the subject matter of any one or more of Examples 56-57 optionally include wherein the air gesture notation is presented on a plurality of staffs, the plurality of staffs including a first staff for right hand air gesture notations, and a second staff for left hand air gesture notations.

In Example 59, the subject matter of any one or more of Examples 32-58 optionally include presenting a plurality of air gesture notations in a musical arrangement.

In Example 60, the subject matter of Example 59 optionally includes wherein presenting the plurality of air gesture notations comprises presenting the plurality of air gesture notations on a musical staff.

In Example 61, the subject matter of any one or more of Examples 59-60 optionally include wherein presenting the plurality of air gesture notations comprises presenting the plurality of air gesture notations without a musical staff.

In Example 62, the subject matter of any one or more of Examples 59-61 optionally include wherein presenting the plurality of air gesture notations comprises presenting a first set of the plurality of air gesture notations and a second set of the plurality of air gesture notations, the first set indicating musical arrangement and the second set indicating dance choreography, the first and second set of air gesture notations coordinated in time.

Example 63 is at least one machine-readable medium including instructions, which when executed by a machine, cause the machine to perform operations of any of the methods of Examples 32-62.

Example 64 is an apparatus comprising means for performing any of the methods of Examples 32-62.

Example 65 is an apparatus for composing gesture-based performances, the apparatus comprising: means for receiving, at a computerized composition system, an indication of an air gesture performed by a user; means for referencing a mapping of air gestures to air gesture notations to identify an air gesture notation corresponding to the air gesture; and means for storing an indication of the air gesture notation in a memory of the computerized composition system.

In Example 66, the subject matter of Example 65 optionally includes wherein the means for receiving the indication of the air gesture comprise means for receiving sensor data from a sensor worn by the user.

In Example 67, the subject matter of Example 66 optionally includes wherein the sensor is integrated into a bracelet, a glove, an anklet, or a shoe.

In Example 68, the subject matter of any one or more of Examples 66-67 optionally include wherein the indication of the air gesture is provided by a gesture detection processor.

In Example 69, the subject matter of any one or more of Examples 65-68 optionally include wherein the means for receiving the indication of the air gesture comprise means for receiving image data from a camera observing the user.

In Example 70, the subject matter of Example 69 optionally includes wherein the image data comprises depth image information.

In Example 71, the subject matter of any one or more of Examples 69-70 optionally include wherein the image data comprises visible light image information, In Example 72, the subject matter of any one or more of Examples 65-71 optionally include wherein the mapping of air gestures comprises a mapping of air gesture notations to musical tones.

In Example 73, the subject matter of any one or more of Examples 65-72 optionally include wherein the mapping of air gestures comprises a mapping of air gesture notations to dance movements.

In Example 74, the subject matter of any one or more of Examples 65-73 optionally include wherein the air gesture notation indicates a directionality of the air gesture.

In Example 75, the subject matter of any one or more of Examples 65-74 optionally include wherein the air gesture notation comprises a circle with a shaded portion, the shaded portion indicating a directionality of the air gesture.

In Example 76, the subject matter of Example 75 optionally includes wherein the shaded portion indicates a palm tap air gesture.

In Example 77, the subject matter of any one or more of Examples 65-76 optionally include wherein the air gesture notation comprises a non-equilateral triangle indicating a directionality of the air gesture.

In Example 78, the subject matter of Example 77 optionally includes wherein the non-equilateral triangle indicates a knife tap air gesture.

In Example 79, the subject matter of any one or more of Examples 65-78 optionally include wherein the air gesture notation comprises a modifier that alters the air gesture notation.

In Example 80, the subject matter of Example 79 optionally includes wherein the modifier comprises a hat symbol oriented over the air gesture notation, the hat symbol indicating that performance of a second air gesture is performed simultaneously with the air gesture.

In Example 81, the subject matter of any one or more of Examples 79-80 optionally include wherein the hat symbol indicates that the user perform a foot gesture as the second air gesture.

In Example 82, the subject matter of any one or more of Examples 79-81 optionally include wherein the hat symbol indicates that a musical note is modified from the air gesture notation without the hat symbol.

In Example 83, the subject matter of Example 82 optionally includes wherein the musical note is modified with a sharp.

In Example 84, the subject matter of any one or more of Examples 82-83 optionally include wherein the musical note is modified with a flat.

In Example 85, the subject matter of any one or more of Examples 79-84 optionally include wherein the modifier comprises a dot symbol oriented over the air gesture notation, the dot symbol indicating that performance of a second air gesture is performed simultaneously with the air gesture.

In Example 86, the subject matter of Example 85 optionally includes wherein the dot symbol indicates that a musical note is modified from the air gesture notation without the dot symbol.

In Example 87, the subject matter of Example 86 optionally includes wherein the musical note is modified with a sharp.

In Example 88, the subject matter of any one or more of Examples 86-87 optionally include wherein the musical note is modified with a flat.

In Example 89, the subject matter of any one or more of Examples 65-88 optionally include wherein the air gesture notation indicates a handedness of the air gesture.

In Example 90, the subject matter of Example 89 optionally includes wherein the air gesture notation is in a first color for a right hand performance of the air gesture, and the air gesture notation is in a second color for a left hand performance of the air gesture, the first and second colors being different colors.

In Example 91, the subject matter of any one or more of Examples 89-90 optionally include wherein the air gesture notation is presented on a plurality of staffs, the plurality of staffs including a first staff for right hand air gesture notations, and a second staff for left hand air gesture notations.

In Example 92, the subject matter of any one or more of Examples 65-91 optionally include means for presenting a plurality of air gesture notations in a musical arrangement.

In Example 93, the subject matter of Example 92 optionally includes wherein the means for presenting the plurality of air gesture notations comprise means for presenting the plurality of air gesture notations on a musical staff.

In Example 94, the subject matter of any one or more of Examples 92-93 optionally include wherein the means for presenting the plurality of air gesture notations comprise means for presenting the plurality of air gesture notations without a musical staff.

In Example 95, the subject matter of any one or more of Examples 92-94 optionally include wherein the means for presenting the plurality of air gesture notations comprise means for presenting a first set of the plurality of air gesture notations and a second set of the plurality of air gesture notations, the first set indicating musical arrangement and the second set indicating dance choreography, the first and second set of air gesture notations coordinated in time.

Example 96 is at least one machine-readable medium including instructions for composing gesture-based performances, which when executed by a computerized composition system, cause the computerized composition system to: receive an indication of an air gesture performed by a user; reference a mapping of air gestures to air gesture notations to identify an air gesture notation corresponding to the air gesture; and store an indication of the air gesture notation in a memory of the computerized composition system.

In Example 97, the subject matter of Example 96 optionally includes wherein the instructions to receive the indication of the air gesture comprise instructions to receive sensor data from a sensor worn by the user.

In Example 98, the subject matter of Example 97 optionally includes wherein the sensor is integrated into a bracelet, a glove, an anklet, or a shoe.

In Example 99, the subject matter of any one or more of Examples 97-98 optionally include wherein the indication of the air gesture is provided by a gesture detection processor.

In Example 100, the subject matter of any one or more of Examples 96-99 optionally include wherein the instructions to receive the indication of the air gesture comprise instructions to receive image data from a camera observing the user.

In Example 101, the subject matter of Example 100 optionally includes wherein the image data comprises depth image information.

In Example 102, the subject matter of any one or more of Examples 100-101 optionally include wherein the image data comprises visible light image information.

In Example 103, the subject matter of any one or more of Examples 96-102 optionally include wherein the mapping of air gestures comprises a mapping of air gesture notations to musical tones.

In Example 104, the subject matter of any one or more of Examples 96-103 optionally include wherein the mapping of air gestures comprises a mapping of air gesture notations to dance movements.

In Example 105, the subject matter of any one or more of Examples 96-104 optionally include wherein the air gesture notation indicates a directionality of the air gesture.

In Example 106, the subject matter of any one or more of Examples 96-105 optionally include wherein the air gesture notation comprises a circle with a shaded portion, the shaded portion indicating a directionality of the air gesture.

In Example 107, the subject matter of Example 106 optionally includes wherein the shaded portion indicates a palm tap air gesture.

In Example 108, the subject matter of any one or more of Examples 96-107 optionally include wherein the air gesture notation comprises a non-equilateral triangle indicating a directionality of the air gesture.

In Example 109, the subject matter of Example 108 optionally includes wherein the non-equilateral triangle indicates a knife tap air gesture.

In Example 110, the subject matter of any one or more of Examples 96-109 optionally include wherein the air gesture notation comprises a modifier that alters the air gesture notation.

In Example 111, the subject matter of Example 110 optionally includes wherein the modifier comprises a hat symbol oriented over the air gesture notation, the hat symbol indicating that performance of a second air gesture is performed simultaneously with the air gesture.

In Example 112, the subject matter of any one or more of Examples 110-111 optionally include wherein the hat symbol indicates that the user perform a foot gesture as the second air gesture.

In Example 113, the subject matter of any one or more of Examples 110-112 optionally include wherein the hat symbol indicates that a musical note is modified from the air gesture notation without the hat symbol.

In Example 114, the subject matter of Example 113 optionally includes wherein the musical note is modified with a sharp.

In Example 115, the subject matter of any one or more of Examples 113-114 optionally include wherein the musical note is modified with a flat.

In Example 116, the subject matter of any one or more of Examples 110-115 optionally include wherein the modifier comprises a dot symbol oriented over the air gesture notation, the dot symbol indicating that performance of a second air gesture is performed simultaneously with the air gesture.

In Example 117, the subject matter of Example 116 optionally includes wherein the dot symbol indicates that a musical note is modified from the air gesture notation without the dot symbol.

In Example 118, the subject matter of Example 117 optionally includes wherein the musical note is modified with a sharp.

In Example 119, the subject matter of any one or more of Examples 117-118 optionally include wherein the musical note is modified with a flat.

In Example 120, the subject matter of any one or more of Examples 96-119 optionally include wherein the air gesture notation indicates a handedness of the air gesture.

In Example 121, the subject matter of Example 120 optionally includes wherein the air gesture notation is in a first color for a right hand performance of the air gesture, and the air gesture notation is in a second color for a left hand performance of the air gesture, the first and second colors being different colors.

In Example 122, the subject matter of any one or more of Examples 120-121 optionally include wherein the air gesture notation is presented on a plurality of staffs, the plurality of staffs including a first staff for right hand air gesture notations, and a second staff for left hand air gesture notations.

In Example 123, the subject matter of any one or more of Examples 96-122 optionally include instructions to present a plurality of air gesture notations in a musical arrangement.

In Example 124, the subject matter of Example 123 optionally includes wherein the instructions to present the plurality of air gesture notations comprise instructions to present the plurality of air gesture notations on a musical staff.

In Example 125, the subject matter of any one or more of Examples 123-124 optionally include wherein the instructions to present the plurality of air gesture notations comprise instructions to present the plurality of air gesture notations without a musical staff.

In Example 126, the subject matter of any one or more of Examples 123-125 optionally include wherein the instructions to present the plurality of air gesture notations comprise instructions to present a first set of the plurality of air gesture notations and a second set of the plurality of air gesture notations, the first set indicating musical arrangement and the second set indicating dance choreography, the first and second set of air gesture notations coordinated in time.

Example 127 is a computerized composition system for composing gesture-based performances, the system comprising: a processor subsystem; and memory including instructions, which when executed by the processor subsystem, cause the processor subsystem to: receive, at a computerized composition system, an indication of a musical note; reference a mapping of musical notes to air gesture notations to identify an air gesture notation corresponding to the musical note; and store an indication of the air gesture notation in a memory of the computerized composition system.

In Example 128, the subject matter of Example 127 optionally includes wherein to receive the indication of the musical note, the processor subsystem is to receive musical information from a musical instrument.

In Example 129, the subject matter of any one or more of Examples 127-128 optionally include wherein to receive the indication of the musical note, the processor subsystem is to read e a musical score.

In Example 130, the subject matter of any one or more of Examples 127-129 optionally include where the processor subsystem is to present a plurality of air gesture notations in a musical arrangement.

Example 131 is a method for composing gesture-based performances, the method comprising: receiving, at a computerized composition system, an indication of a musical note; referencing a mapping of musical notes to air gesture notations to identify an air gesture notation corresponding to the musical note; and storing an indication of the air gesture notation in a memory of the computerized composition system.

In Example 132, the subject matter of Example 131 optionally includes wherein receiving the indication of the musical note comprises receiving musical information from a musical instrument.

In Example 133, the subject matter of any one or more of Examples 131-132 optionally include wherein receiving the indication of the musical note comprises reading a musical score.

In Example 134, the subject matter of any one or more of Examples 131-133 optionally include presenting a plurality of air gesture notations in a musical arrangement.

Example 135 is at least one machine-readable medium including instructions, which when executed by a machine, cause the machine to perform operations of any of the methods of Examples 131-134.

Example 136 is an apparatus comprising means for performing any of the methods of Examples 131-134.

Example 137 is an apparatus for composing gesture-based performances, the apparatus comprising: means for receiving, at a computerized composition system, an indication of a musical note; means for referencing a mapping of musical notes to air gesture notations to identify an air gesture notation corresponding to the musical note; and means for storing an indication of the air gesture notation in a memory of the computerized composition system.

In Example 138, the subject matter of Example 137 optionally includes wherein the means for receiving the indication of the musical note comprise means for receiving musical information from a musical instrument.

In Example 139, the subject matter of any one or more of Examples 137-138 optionally include wherein the means for receiving the indication of the musical note comprise means for reading a musical score.

In Example 140, the subject matter of any one or more of Examples 137-139 optionally include means for presenting a plurality of air gesture notations in a musical arrangement.

Example 141 is at least one machine-readable medium including instructions for composing gesture-based performances, which when executed by a computerized composition system, cause the computerized composition system to: receive, at a computerized composition system, an indication of a musical note; reference a mapping of musical notes to air gesture notations to identify an air gesture notation corresponding to the musical note; and store an indication of the air gesture notation in a memory of the computerized composition system.

In Example 142, the subject matter of Example 141 optionally includes wherein the instructions to receive the indication of the musical note comprise instructions to receive musical information from a musical instrument.

In Example 143, the subject matter of any one or more of Examples 141-142 optionally include wherein the instructions to receive the indication of the musical note comprise instructions to read a musical score.

In Example 144, the subject matter of any one or more of Examples 141-143 optionally include instructions to present a plurality of air gesture notations in a musical arrangement.

Example 145 is a system for instructing gesture-based performances, the system comprising: a processor subsystem; and memory including instructions, which when executed by the processor subsystem, cause the processor subsystem to: present a plurality of air gesture notations in a musical arrangement; receive an indication of an air gesture performed by a user; reference a mapping of air gestures to air gesture notations to identify an air gesture notation corresponding to the air gesture; and guide the user through the musical arrangement by sequentially highlighting the air gesture notations in the musical arrangement based on the mapping of air gestures to air gesture notations.

In Example 146, the subject matter of Example 145 optionally includes wherein to present the plurality of air gesture notations, the processor subsystem is to present the plurality of air gesture notations on a musical staff.

In Example 147, the subject matter of any one or more of Examples 145-146 optionally include wherein to present the plurality of air gesture notations, the processor subsystem is to present the plurality of air gesture notations without a musical staff.

In Example 148, the subject matter of any one or more of Examples 145-147 optionally include wherein to present the plurality of air gesture notations, the processor subsystem is to present a first set of the plurality of air gesture notations and a second set of the plurality of air gesture notations, the first set indicating musical arrangement and the second set indicating dance choreography, the first and second set of air gesture notations coordinated in time.

In Example 149, the subject matter of any one or more of Examples 145-148 optionally include wherein to receive the indication of the air gesture, the processor subsystem is to receive sensor data from a sensor worn by the user.

In Example 150, the subject matter of Example 149 optionally includes wherein the sensor is integrated into a bracelet, a glove, an anklet, or a shoe.

In Example 151, the subject matter of any one or more of Examples 149-150 optionally include wherein the indication of the air gesture is provided by a gesture detection processor.

In Example 152, the subject matter of any one or more of Examples 145-151 optionally include wherein to receive the indication of the air gesture, the processor subsystem is to receive image data from a camera observing the user.

In Example 153, the subject matter of Example 152 optionally includes wherein the image data comprises depth image information.

In Example 154, the subject matter of any one or more of Examples 152-153 optionally include wherein the image data comprises visible light image information.

In Example 155, the subject matter of any one or more of Examples 145-154 optionally include wherein the mapping of air gestures comprises a mapping of air gesture notations to musical tones.

In Example 156, the subject matter of any one or more of Examples 145-155 optionally include wherein the mapping of air gestures comprises a mapping of air gesture notations to dance movements.

In Example 157, the subject matter of any one or more of Examples 145-156 optionally include wherein the air gesture notation indicates a directionality of the air gesture.

In Example 158, the subject matter of any one or more of Examples 145-157 optionally include wherein the air gesture notation comprises a circle with a shaded portion, the shaded portion indicating a directionality of the air gesture.

In Example 159, the subject matter of Example 158 optionally includes wherein the shaded portion indicates a palm tap air gesture.

In Example 160, the subject matter of any one or more of Examples 145-159 optionally include wherein the air gesture notation comprises a non-equilateral triangle indicating a directionality of the air gesture.

In Example 161, the subject matter of Example 160 optionally includes wherein the non-equilateral triangle indicates a knife tap air gesture.

In Example 162, the subject matter of any one or more of Examples 145-161 optionally include wherein the air gesture notation comprises a modifier that alters the air gesture notation.

In Example 163, the subject matter of Example 162 optionally includes wherein the modifier comprises a hat symbol oriented over the air gesture notation, the hat symbol indicating that performance of a second air gesture is performed simultaneously with the air gesture.

In Example 164, the subject matter of Example 163 optionally includes wherein the hat symbol indicates that the user perform a foot gesture as the second air gesture.

In Example 165, the subject matter of any one or more of Examples 163-164 optionally include wherein the hat symbol indicates that a musical note is modified from the air gesture notation without the hat symbol.

In Example 166, the subject matter of Example 165 optionally includes wherein the musical note is modified with a sharp.

In Example 167, the subject matter of any one or more of Examples 165-166 optionally include wherein the musical note is modified with a flat.

In Example 168, the subject matter of any one or more of Examples 162-167 optionally include wherein the modifier comprises a dot symbol oriented over the air gesture notation, the dot symbol indicating that performance of a second air gesture is performed simultaneously with the air gesture.

In Example 169, the subject matter of Example 168 optionally includes wherein the dot symbol indicates that a musical note is modified from the air gesture notation without the dot symbol.

In Example 170, the subject matter of Example 169 optionally includes wherein the musical note is modified with a sharp.

In Example 171, the subject matter of any one or more of Examples 169-170 optionally include wherein the musical note is modified with a flat.

In Example 172, the subject matter of any one or more of Examples 145-171 optionally include wherein the air gesture notation indicates a handedness of the air gesture.

In Example 173, the subject matter of Example 172 optionally includes wherein the air gesture notation is in a first color for a right hand performance of the air gesture, and the air gesture notation is in a second color for a left hand performance of the air gesture, the first and second colors being different colors.

In Example 174, the subject matter of any one or more of Examples 172-173 optionally include wherein the air gesture notation is presented on a plurality of staffs, the plurality of staffs including a first staff for right hand air gesture notations, and a second staff for left hand air gesture notations.

Example 175 is a method for instructing gesture-based performances, the method comprising: presenting a plurality of air gesture notations in a musical arrangement; receiving, at a computerized system, an indication of an air gesture performed by a user; referencing a mapping of air gestures to air gesture notations to identify an air gesture notation corresponding to the air gesture; and guiding the user through the musical arrangement by sequentially highlighting the air gesture notations in the musical arrangement based on the mapping of air gestures to air gesture notations.

In Example 176, the subject matter of Example 175 optionally includes wherein presenting the plurality of air gesture notations comprises presenting the plurality of air gesture notations on a musical staff.

In Example 177, the subject matter of any one or more of Examples 175-176 optionally include wherein presenting the plurality of air gesture notations comprises presenting the plurality of air gesture notations without a musical staff.

In Example 178, the subject matter of any one or more of Examples 175-177 optionally include wherein presenting the plurality of air gesture notations comprises presenting a first set of the plurality of air gesture notations and a second set of the plurality of air gesture notations, the first set indicating musical arrangement and the second set indicating dance choreography, the first and second set of air gesture notations coordinated in time.

In Example 179, the subject flatter of any one or more of Examples 175-178 optionally include wherein receiving the indication of the air gesture comprises receiving sensor data from a sensor worn by the user.

In Example 180, the subject matter of Example 179 optionally includes wherein the sensor is integrated into a bracelet, a glove, an anklet, or a shoe.

In Example 181, the subject matter of any one or more of Examples 179-180 optionally include wherein the indication of the air gesture is provided by a gesture detection processor.

In Example 182, the subject matter of any one or more of Examples 175-181 optionally include wherein receiving the indication of the air gesture comprises receiving image data from a camera observing the user.

In Example 183, the subject matter of Example 182 optionally includes wherein the image data comprises depth image information.

In Example 184, the subject matter of any one or more of Examples 182-183 optionally include wherein the image data comprises visible light image information.

In Example 185, the subject matter of any one or more of Examples 175-184 optionally include wherein the mapping of air gestures comprises a mapping of air gesture notations to musical tones.

In Example 186, the subject matter of any one or more of Examples 175-185 optionally include wherein the mapping of air gestures comprises a mapping of air gesture notations to dance movements.

In Example 187, the subject matter of any one or more of Examples 175-186 optionally include wherein the air gesture notation indicates a directionality of the air gesture.

In Example 188, the subject matter of any one or more of Examples 175-187 optionally include wherein the air gesture notation comprises a circle with a shaded portion, the shaded portion indicating a directionality of the air gesture.

In Example 189, the subject matter of Example 188 optionally includes wherein the shaded portion indicates a palm tap air gesture.

In Example 190, the subject matter of any one or more of Examples 175-189 optionally include wherein the air gesture notation comprises a non-equilateral triangle indicating a directionality of the air gesture.

In Example 191, the subject matter of Example 190 optionally includes wherein the non-equilateral triangle indicates a knife tap air gesture.

In Example 192, the subject matter of any one or more of Examples 175-191 optionally include wherein the air gesture notation comprises a modifier that alters the air gesture notation.

In Example 193, the subject matter of Example 192 optionally includes wherein the modifier comprises a hat symbol oriented over the air gesture notation, the hat symbol indicating that performance of a second air gesture is performed simultaneously with the air gesture.

In Example 194, the subject matter of Example 193 optionally includes wherein the hat symbol indicates that the user perform a foot gesture as the second air gesture.

In Example 195, the subject matter of any one or more of Examples 193-194 optionally include wherein the hat symbol indicates that a musical note is modified from the air gesture notation without the hat symbol.

In Example 196, the subject matter of Example 195 optionally includes wherein the musical note is modified with a sharp.

In Example 197, the subject matter of any one or more of Examples 195-196 optionally include wherein the musical note is modified with a flat.

In Example 198, the subject matter of any one or more of Examples 192-197 optionally include wherein the modifier comprises a dot symbol oriented over the air gesture notation, the dot symbol indicating that performance of a second air gesture is performed simultaneously with the air gesture.

In Example 199, the subject matter of Example 198 optionally includes wherein the dot symbol indicates that a musical note is modified from the air gesture notation without the dot symbol.

In Example 200, the subject matter of Example 199 optionally includes wherein the musical note is modified with a sharp.

In Example 201, the subject matter of any one or more of Examples 199-200 optionally include wherein the musical note is modified with a flat.

In Example 202, the subject matter of any one or more of Examples 175-201 optionally include wherein the air gesture notation indicates a handedness of the air gesture.

In Example 203, the subject matter of Example 202 optionally includes wherein the air gesture notation is in a first color for a right hand performance of the air gesture, and the air gesture notation is in a second color for a left hand performance of the air gesture, the first and second colors being different colors.

In Example 204, the subject matter of any one or more of Examples 202-203 optionally include wherein the air gesture notation is presented on a plurality of staffs, the plurality of staffs including a first staff for right hand air gesture notations, and a second staff for left hand air gesture notations.

Example 205 is at least one machine-readable medium including instructions, which when executed by a machine, cause the machine to perform operations of any of the methods of Examples 175-204.

Example 206 is an apparatus comprising means for performing any of the methods of Examples 175-204.

Example 207 is an apparatus for instructing gesture-based performances, the apparatus comprising: means for presenting a plurality of air gesture notations in a musical arrangement; means for receiving, at a computerized system, an indication of an air gesture performed by a user; means for referencing a mapping of air gestures to air gesture notations to identify an air gesture notation corresponding to the air gesture; and means for guiding the user through the musical arrangement by sequentially highlighting the air gesture notations in the musical arrangement based on the flapping of air gestures to air gesture notations.

In Example 208, the subject matter of Example 207 optionally includes wherein the means for means for presenting the plurality of air gesture notations comprise means for presenting the plurality of air gesture notations on a musical staff.

In Example 209, the subject matter of any one or more of Examples 207-208 optionally include wherein the means for presenting the plurality of air gesture notations comprise means for presenting the plurality of air gesture notations without a musical staff.

In Example 210, the subject flatter of any one or more of Examples 207-209 optionally include wherein the means for presenting the plurality of air gesture notations comprise means for presenting a first set of the plurality of air gesture notations and a second set of the plurality of air gesture notations, the first set indicating musical arrangement arid the second set indicating dance choreography, the first and second set of air gesture notations coordinated in time.

In Example 211, the subject matter of any one or more of Examples 207-210 optionally include wherein the means for receiving the indication of the air gesture comprise means for receiving sensor data from a sensor worn by the user.

In Example 212, the subject matter of Example 211 optionally includes wherein the sensor is integrated into a bracelet, a glove, an anklet, or a shoe.

In Example 213, the subject matter of any one or more of Examples 211-212 optionally include wherein the indication of the air gesture is provided by a gesture detection processor.

In Example 214, the subject matter of any one or more of Examples 207-213 optionally include wherein the means for receiving the indication of the air gesture comprise means for receiving image data from a camera observing the user.

In Example 215, the subject matter of Example 214 optionally includes wherein the image data comprises depth image information.

In Example 216, the subject matter of any one or more of Examples 214-215 optionally include wherein the image data comprises visible light image information.

In Example 217, the subject matter of any one or more of Examples 207-216 optionally include wherein the mapping of air gestures comprises a mapping of air gesture notations to musical tones.

In Example 218, the subject matter of any one or more of Examples 207-217 optionally include wherein the mapping of air gestures comprises a flapping of air gesture notations to dance movements.

In Example 219, the subject matter of any one or more of Examples 207-218 optionally include wherein the air gesture notation indicates a directionality of the air gesture.

In Example 220, the subject flatter of any one or more of Examples 207-219 optionally include wherein the air gesture notation comprises a circle with a shaded portion, the shaded portion indicating a directionality of the air gesture.

In Example 221, the subject matter of Example 220 optionally includes wherein the shaded portion indicates a palm tap air gesture.

In Example 222, the subject matter of any one or more of Examples 207-221 optionally include wherein the air gesture notation comprises a non-equilateral triangle indicating a directionality of the air gesture.

In Example 223, the subject matter of Example 222 optionally includes wherein the non-equilateral triangle indicates a knife tap air gesture.

In Example 224, the subject matter of any one or more of Examples 207-223 optionally include wherein the air gesture notation comprises a modifier that alters the air gesture notation.

In Example 225, the subject matter of Example 224 optionally includes wherein the modifier comprises a hat symbol oriented over the air gesture notation, the hat symbol indicating that performance of a second air gesture is performed simultaneously with the air gesture.

In Example 226, the subject matter of Example 225 optionally includes wherein the hat symbol indicates that the user perform a foot gesture as the second air gesture.

In Example 227, the subject matter of any one or more of Examples 225-226 optionally include wherein the hat symbol indicates that a musical note is modified from the air gesture notation without the hat symbol.

In Example 228, the subject matter of Example 227 optionally includes wherein the musical note is modified with a sharp.

In Example 229, the subject matter of any one or more of Examples 227-228 optionally include wherein the musical note is modified with a flat.

In Example 230, the subject matter of any one or more of Examples 224-229 optionally include wherein the modifier comprises a dot symbol oriented over the air gesture notation, the dot symbol indicating that performance of a second air gesture is performed simultaneously with the air gesture.

In Example 231, the subject matter of Example 230 optionally includes wherein the dot symbol indicates that a musical note is modified from the air gesture notation without the dot symbol.

In Example 232, the subject matter of Example 231 optionally includes wherein the musical note is modified with a sharp.

In Example 233, the subject matter of any one or more of Examples 231-232 optionally include wherein the musical note is modified with a flat.

In Example 234, the subject matter of any one or more of Examples 207-233 optionally include wherein the air gesture notation indicates a handedness of the air gesture.

In Example 235, the subject matter of Example 234 optionally includes wherein the air gesture notation is in a first color for a right hand performance of the air gesture, and the air gesture notation is in a second color for a left hand performance of the air gesture, the first and second colors being different colors.

In Example 236, the subject matter of any one or more of Examples 234-235 optionally include wherein the air gesture notation is presented on a plurality of staffs, the plurality of staffs including a first staff for right hand air gesture notations, and a second staff for left hand air gesture notations.

Example 237 is at least one machine-readable medium including instructions for instructing gesture-based performances, which when executed by a computerized composition system, cause the computerized composition system to: present a plurality of air gesture notations in a musical arrangement; receive, at a computerized system, an indication of an air gesture performed by a user; reference a mapping of air gestures to air gesture notations to identify an air gesture notation corresponding to the air gesture; and guide the user through the musical arrangement by sequentially highlighting the air gesture notations in the musical arrangement based on the mapping of air gestures to air gesture notations.

In Example 238, the subject matter of Example 237 optionally includes wherein the instructions to present the plurality of air gesture notations comprise instructions to present the plurality of air gesture notations on a musical staff.

In Example 239, the subject matter of any one or more of Examples 237-238 optionally include wherein the instructions to present the plurality of air gesture notations comprise instructions to present the plurality of air gesture notations without a musical staff.

In Example 240, the subject matter of any one or more of Examples 237-239 optionally include wherein the instructions to present the plurality of air gesture notations comprise instructions to present a first set of the plurality of air gesture notations and a second set of the plurality of air gesture notations, the first set indicating musical arrangement and the second set indicating dance choreography, the first and second set of air gesture notations coordinated in time.

In Example 241, the subject matter of any one or more of Examples 237-240 optionally include wherein the instructions to receive the indication of the air gesture comprise instructions to receive sensor data from a sensor worn by the user.

In Example 242, the subject matter of Example 241 optionally includes wherein the sensor is integrated into a bracelet, a glove, an anklet, or a shoe.

In Example 243, the subject matter of any one or more of Examples 241-242 optionally include wherein the indication of the air gesture is provided by a gesture detection processor.

In Example 244, the subject matter of any one or more of Examples 237-243 optionally include wherein instructions to receive the indication of the air gesture comprise instructions to receive image data from a camera observing the user.

In Example 245, the subject matter of Example 244 optionally includes wherein the image data comprises depth image information.

In Example 246, the subject matter of any one or more of Examples 244-245 optionally include wherein the image data comprises visible light image information.

In Example 247, the subject matter of any one or more of Examples 237-246 optionally include wherein the mapping of air gestures comprises a mapping of air gesture notations to musical tones.

In Example 248, the subject matter of any one or more of Examples 237-247 optionally include wherein the mapping of air gestures comprises a mapping of air gesture notations to dance movements.

In Example 249, the subject matter of any one or more of Examples 237-248 optionally include wherein the air gesture notation indicates a directionality of the air gesture.

In Example 250, the subject matter of any one or more of Examples 237-249 optionally include wherein the air gesture notation comprises a circle with a shaded portion, the shaded portion indicating a directionality of the air gesture.

In Example 251, the subject matter of Example 250 optionally includes wherein the shaded portion indicates a palm tap air gesture.

In Example 252, the subject matter of any one or more of Examples 237-251 optionally include wherein the air gesture notation comprises a non-equilateral triangle indicating a directionality of the air gesture.

In Example 253, the subject matter of Example 252 optionally includes wherein the non-equilateral triangle indicates a knife tap air gesture.

In Example 254, the subject matter of any one or more of Examples 237-253 optionally include wherein the air gesture notation comprises a modifier that alters the air gesture notation.

In Example 255, the subject matter of Example 254 optionally includes wherein the modifier comprises a hat symbol oriented over the air gesture notation, the hat symbol indicating that performance of a second air gesture is performed simultaneously with the air gesture.

In Example 256, the subject matter of Example 255 optionally includes wherein the hat symbol indicates that the user perform a foot gesture as the second air gesture.

In Example 257, the subject matter of any one or more of Examples 255-256 optionally include wherein the hat symbol indicates that a musical note is modified from the air gesture notation without the hat symbol.

In Example 258, the subject matter of Example 257 optionally includes wherein the musical note is modified with a sharp.

In Example 259, the subject matter of any one or more of Examples 257-258 optionally include wherein the musical note is modified with a flat.

In Example 260, the subject matter of any one or more of Examples 254-259 optionally include wherein the modifier comprises a dot symbol oriented over the air gesture notation, the dot symbol indicating that performance of a second air gesture is performed simultaneously with the air gesture.

In Example 261, the subject matter of Example 260 optionally includes wherein the dot symbol indicates that a musical note is modified from the air gesture notation without the dot symbol.

In Example 262, the subject matter of Example 261 optionally includes wherein the musical note is modified with a sharp.

In Example 263, the subject matter of any one or more of Examples 261-262 optionally include wherein the musical note is modified with a flat.

In Example 264, the subject matter of any one or more of Examples 237-263 optionally include wherein the air gesture notation indicates a handedness of the air gesture.

In Example 265, the subject matter of Example 264 optionally includes wherein the air gesture notation is in a first color for a right hand performance of the air gesture, and the air gesture notation is in a second color for a left hand performance of the air gesture, the first and second colors being different colors.

In Example 266, the subject matter of any one or more of Examples 264-265 optionally include wherein the air gesture notation is presented on a plurality of staffs, the plurality of staffs including a first staff for right hand air gesture notations, and a second staff for left hand air gesture notations.

Example 267 is at least one machine-readable medium including instructions, which when executed by a machine, cause the machine to perform operations of any of the operations of Examples 1-266.

Example 268 is an apparatus comprising means for performing any of the operations of Examples 1-266.

Example 269 is a system to perform operations of any of Examples 1-266.

Example 270 is a method to perform the operations of any of the Examples 1-266.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computerized composition system for composing gesture-based performances, the system comprising:
    a processor subsystem; and
    memory including instructions, which when executed by the processor subsystem, cause the processor subsystem to:
        receive an indication of an air gesture performed by a user;
        reference a mapping of air gestures to air gesture notations to identify an air gesture notation corresponding to the air gesture; and
        store an indication of the air gesture notation in a memory of the computerized composition system,
        wherein the air gesture notation comprises a circle with a shaded portion, the shaded portion indicating a directionality of the air gesture, or the air gesture comprises a non-equilateral triangle indicating a directionality of the air gesture.

2. The system of claim 1, wherein to receive the indication of the air gesture, the processor subsystem is to receive sensor data via a sensor interface circuit, from a sensor worn by the user.

3. The system of claim 2, wherein the sensor is integrated into a bracelet, a glove, an anklet, or a shoe.

4. The system of claim 2, wherein the indication of the air gesture is provided by a gesture detection processor.

5. The system of claim 1, wherein to receive the indication of the air gesture, the processor subsystem is to receive image data from a camera observing the user.

6. The system of claim 1, wherein the shaded portion indicates a palm tap air gesture.

7. The system of claim 1, wherein the non-equilateral triangle indicates a knife tap air gesture.

8. The system of claim 1, wherein the air gesture notation comprises a modifier that alters the air gesture notation.

9. A method for composing gesture-based performances, the method comprising:
    receiving, at a computerized composition system, an indication of an air gesture performed by a user;
    referencing a mapping of air gestures to air gesture notations to identify an air gesture notation corresponding to the air gesture; and
    storing an indication of the air gesture notation in a memory of the computerized composition system,
    wherein the air gesture notation comprises a modifier that alters the air gesture notation, and wherein the modifier comprises a hat symbol oriented over the air gesture notation, the hat symbol indicating that performance of a second air gesture is performed simultaneously with the air gesture.

10. The method of claim 9, wherein the hat symbol indicates that the user perform a foot gesture as the second air gesture.

11. The method of claim 9, wherein the hat symbol indicates that a musical note is modified from the air gesture notation without the hat symbol.

12. The method of claim 11, wherein the musical note is modified with a sharp.

13. The method of claim 9, wherein the air gesture notation indicates a handedness of the air gesture.

14. The method of claim 13, wherein the air gesture notation is in a first color for a right hand performance of the air gesture, and the air gesture notation is in a second color for a left hand performance of the air gesture, the first and second colors being different colors.

15. The method of claim 13, wherein the air gesture notation is presented on a plurality of staffs, the plurality of staffs including a first staff for right hand air gesture notations, and a second staff for left hand air gesture notations.

16. The method of claim 9, further comprising presenting a plurality of air gesture notations in a musical arrangement.

17. The method of claim 16, wherein presenting the plurality of air gesture notations comprises presenting the plurality of air gesture notations on a musical staff.

18. The method of claim 16, wherein presenting the plurality of air gesture notations comprises presenting the plurality of air gesture notations without a musical staff.

19. The method of claim 16, wherein presenting the plurality of air gesture notations comprises presenting a first set of the plurality of air gesture notations and a second set of the plurality of air gesture notations, the first set indicating musical arrangement and the second set indicating dance choreography, the first and second set of air gesture notations coordinated in time.

20. At least one non-transitory machine-readable medium including instructions for composing gesture-based performances, which when executed by a computerized composition system, cause the computerized composition system to:
 receive an indication of an air gesture performed by a user;
 reference a mapping of air gestures to air gesture notations to identify an air gesture notation corresponding to the air gesture; and
 store an indication of the air gesture notation in a memory of the computerized composition system,
 wherein the air gesture notation comprises a modifier that alters the air gesture notation, and wherein the modifier comprises a hat symbol oriented over the air gesture notation, the hat symbol indicating that performance of a second air gesture is performed simultaneously with the air gesture.

21. The at least one non-transitory machine-readable medium of claim 20, further comprising instructions to present a plurality of air gesture notations in a musical arrangement.

* * * * *